(12) United States Patent
Trandafir et al.

(10) Patent No.: US 12,395,555 B2
(45) Date of Patent: *Aug. 19, 2025

(54) SYNCHRONIZING FILE DATA BETWEEN COMPUTER SYSTEMS

(71) Applicant: Microsoft Technology Licensing, LLC, Redmond, WA (US)

(72) Inventors: Marian Trandafir, Sammamish, WA (US); Jason Daniel Shay, Seattle, WA (US); Ivelin Lyubenov Zheglov, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,898

(22) Filed: Oct. 19, 2023

(65) Prior Publication Data
US 2024/0056500 A1 Feb. 15, 2024

Related U.S. Application Data

(63) Continuation of application No. 17/219,296, filed on Mar. 31, 2021, now Pat. No. 11,831,712, which is a
(Continued)

(51) Int. Cl.
*H04L 67/1095* (2022.01)
*G06F 11/14* (2006.01)
(Continued)

(52) U.S. Cl.
CPC ...... *H04L 67/1095* (2013.01); *G06F 11/1451* (2013.01); *G06F 16/178* (2019.01);
(Continued)

(58) Field of Classification Search
CPC ..... H04L 67/1095; H04L 67/01; H04L 67/02; H04L 67/06; H04L 67/561; G06F 11/1451; G06F 16/178; G06F 2201/80
See application file for complete search history.

(56) References Cited

U.S. PATENT DOCUMENTS

2008/0022135 A1* 1/2008 Gaya .................. H04L 9/40
713/193
2010/0070628 A1* 3/2010 Harrang .............. H04L 47/28
709/224
(Continued)

FOREIGN PATENT DOCUMENTS

CN 101360118 A * 2/2009
CN 104603762 A 5/2015
(Continued)

OTHER PUBLICATIONS

First Office Action Received for Chinese Application No. 202110230957.5, mailed on Feb. 19, 2024, 11 pages.
Notice of Grant Received for Chinese Application No. 202110230957.5, mailed on Oct. 24, 2024, 7 pages. (English Translation Provided).

*Primary Examiner* — Shean Tokuta
*Assistant Examiner* — Juan C Turriate Gastulo

(57) ABSTRACT

Non-limiting examples of the present disclosure describe implementation of an exemplary synchronization protocol to identify file data for synchronization as well as negotiate how to achieve data transport for synchronization of the file data. In one example, a request for synchronization of data is received from a processing device. In response to receiving the request, a response is generated. The response may comprise: identification of file data for synchronization, instructions for accessing the file data and instructions indicating a data transport protocol to utilize to obtain the file data. The response may be transmitted to the processing device, for example, to enable the processing device to synchronize file data. Other examples are also described.

20 Claims, 12 Drawing Sheets

Related U.S. Application Data continuation of application No. 16/553,547, filed on Aug. 28, 2019, now Pat. No. 10,979,501, which is a continuation of application No. 15/088,307, filed on Apr. 1, 2016, now Pat. No. 10,425,477.

(60) Provisional application No. 62/219,114, filed on Sep. 15, 2015.

(51) Int. Cl.
  *G06F 16/178* (2019.01)
  *H04L 67/01* (2022.01)
  *H04L 67/02* (2022.01)
  *H04L 67/06* (2022.01)
  *H04L 67/561* (2022.01)

(52) U.S. Cl.
  CPC ............. *H04L 67/01* (2022.05); *H04L 67/02* (2013.01); *H04L 67/06* (2013.01); *H04L 67/561* (2022.05); *G06F 2201/80* (2013.01)

(56) References Cited

U.S. PATENT DOCUMENTS

| | | | | |
|---|---|---|---|---|
| 2013/0340031 A1* | 12/2013 | Amit | ...................... | H04W 12/37 726/1 |
| 2014/0067929 A1* | 3/2014 | Kirigin | ................... | H04L 67/06 709/204 |
| 2014/0075326 A1* | 3/2014 | Cao | ........................ | G06F 16/958 715/739 |
| 2015/0227549 A1* | 8/2015 | Moon | ..................... | G06F 16/13 707/827 |
| 2015/0310219 A1* | 10/2015 | Haager | ................. | H04L 9/0869 713/165 |
| 2016/0352833 A1* | 12/2016 | Dhamdhere | ............ | H04L 69/18 |

FOREIGN PATENT DOCUMENTS

| | | |
|---|---|---|
| EP | 2372574 A1 | 10/2011 |
| WO | 2009092311 A1 | 7/2009 |

\* cited by examiner

100

200

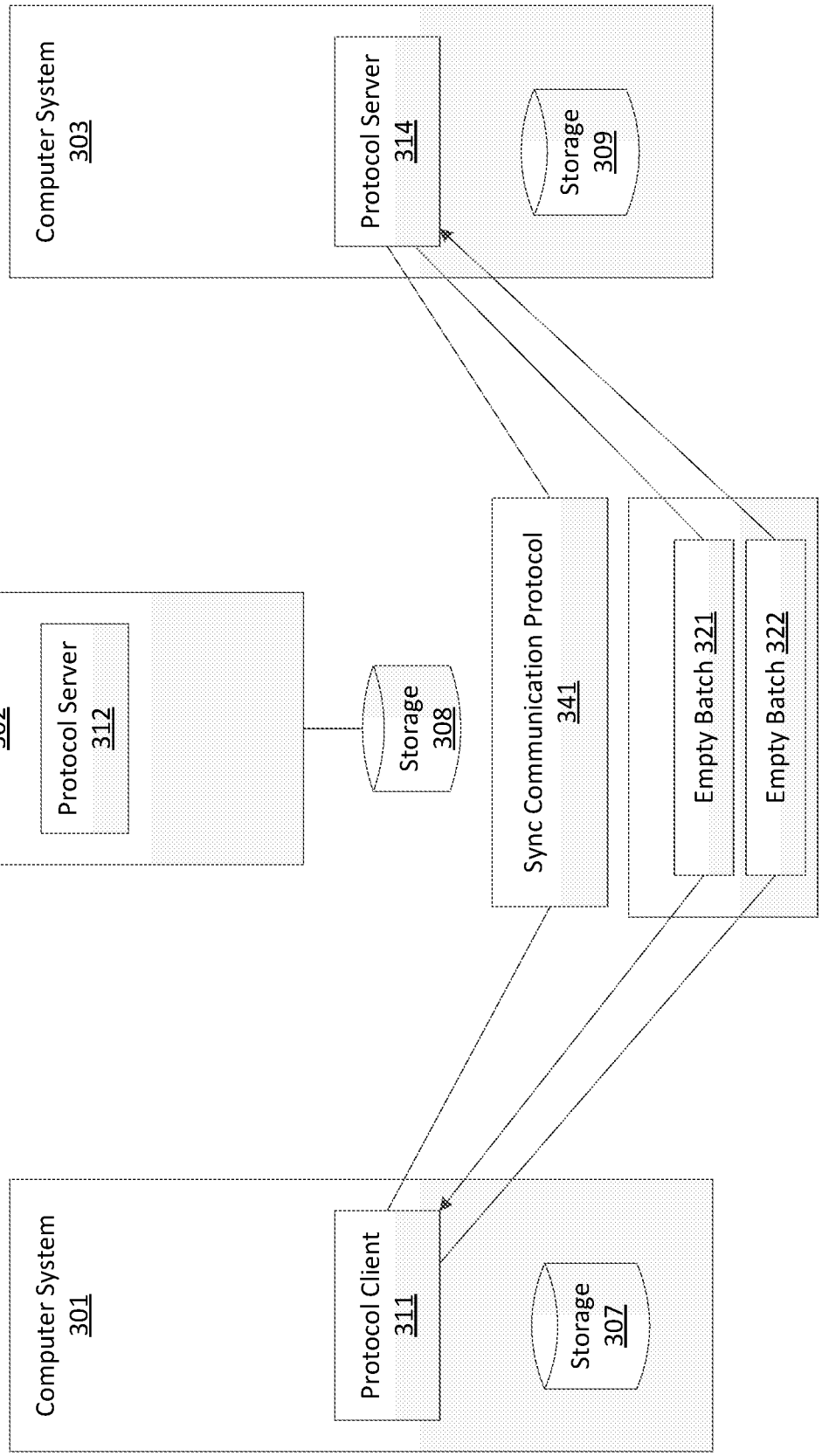

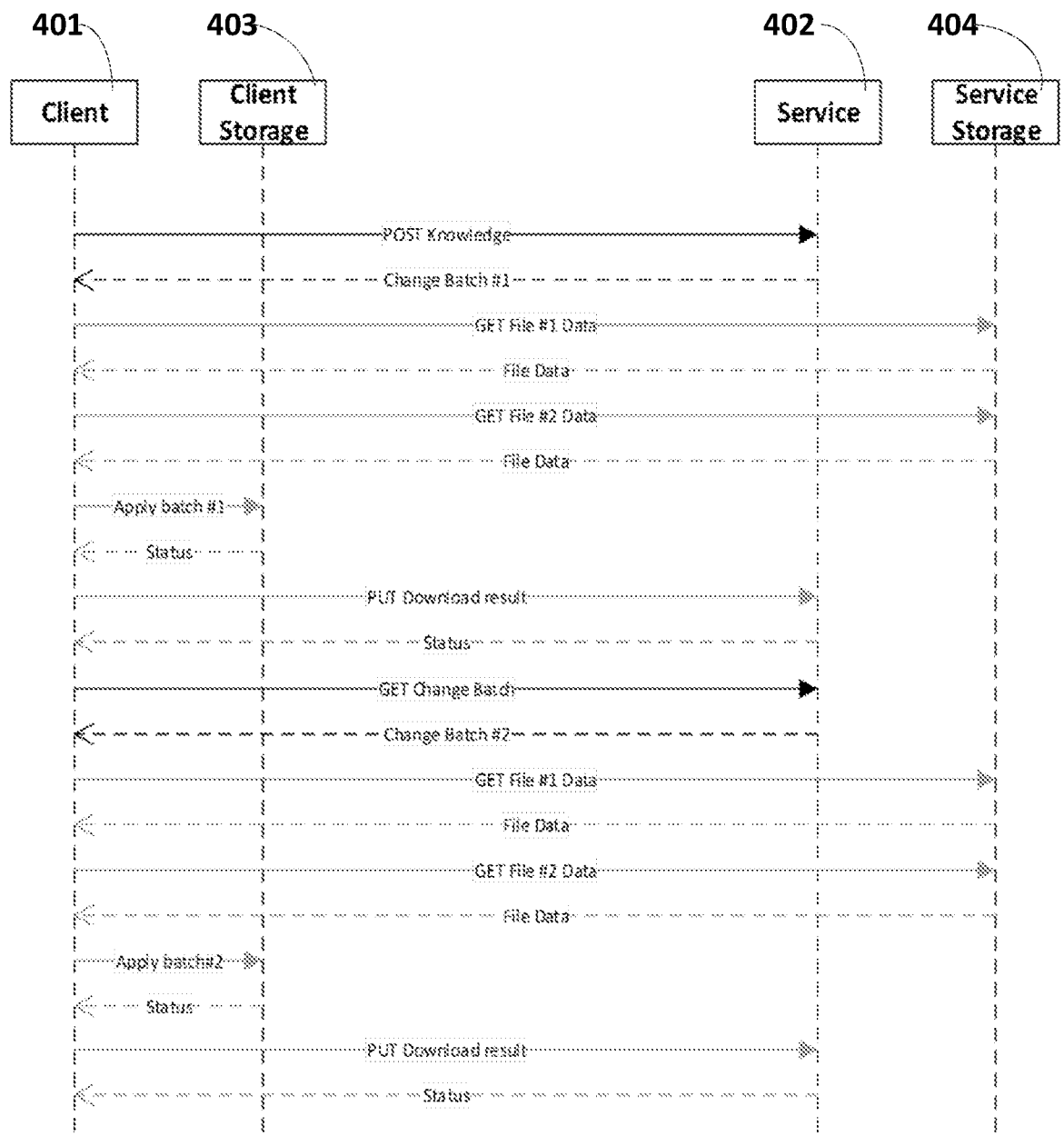

SYNCHRONIZING FILE DATA BETWEEN COMPUTER SYSTEMS

CROSS-REFERENCE TO RELATED APPLICATIONS

This application is a continuation of U.S. patent application Ser. No. 17/219,296 filed Mar. 31, 2021, which is a continuation of U.S. patent application Ser. No. 16/553,547 filed on August 28, 2019, now U.S. Pat. No. 10,979,501 which is a continuation of U.S. patent application Ser. No. 15/088,307, filed on Apr. 1, 2016, now U.S. Pat. No. 10,425,477, which claims the benefit of U.S. Provisional Application No. 62/219,114 filed on Sep. 15, 2015, and which applications are hereby incorporated by reference in their entireties. To the extent appropriate a claim of priority is made to each of the above disclosed applications.

BACKGROUND

File synchronization can be used to synchronize files between machines/devices. There is a wide variety of conventional mechanisms for synchronizing files. However, machines and devices have different form factors, capabilities, and locations and not all mechanisms are compatible with all machines and devices. Nonetheless, users often want their files to be available on any and all devices they use. Some conventional file synchronization solutions either implement a synchronization protocol or implement a file repository protocol (file list, file download, file upload) which can be used to implement file synchronization. Most often, operations for file synchronization are not separate from operations for file data transport. It is with respect to the general technical environment of improved processing for file synchronization that the present application is directed.

BRIEF SUMMARY

Non-limiting examples of the present disclosure describes implementation of an exemplary synchronization protocol that identifies file data for synchronization as well as negotiates how to achieve data transport for synchronization of the file data. A connection for a particular synchronization protocol may be established with a client device. The particular synchronization protocol interfaces with a plurality of data transport protocols and is usable to identify file data to synchronize with the client device and determine a data transport protocol of the plurality of data transport protocols that is to be used to download/upload the particular file data. In one example, a request for synchronization of file data is received from a client device. As an example, the client device may be a protocol client and the request may be received at a protocol server. The request may comprise: identification that the request is generated using a particular file synchronization protocol, knowledge metadata including a compact representation of a version state that identifies file data associated with the client device, and a request for a uniform resource identifier that the client device may use to download the file data for synchronization. A change batch response may be generated. The change batch response may be generated by a processing device such as a protocol server device. An exemplary change batch response is usable for the synchronization of file data. As an example, the change batch response comprises: identification that the change batch response is generated using the particular file synchronization protocol, identification of particular file data for synchronization, instructions for accessing the particular file data including at least one uniform resource identifier for access to the particular file data, and instructions indicating at least one data transport protocol to utilize to obtain the particular file data, for example, when accessed using the uniform resource identifier. In the change batch response, the instructions that indicate at least one data transport protocol may further comprise an instruction to obtain first file data using a first data transport protocol, and an instruction to obtain second file data using a second data transport protocol that is different from the first data transport protocol. The change batch response may be transmitted to the client device. In at least one additional example, an indication that one or more files of the file data are synchronized with the client device may be received. The indication may comprise updated knowledge metadata and in some cases may be received in response to a follow-up request. Additional communications between a client device and a server device may occur, for example, where additional requests and change batch responses may be exchanged to complete synchronization of file data.

In another example, a connection for a particular synchronization protocol may be established between a processing device and another processing device. The particular synchronization protocol interfaces with a plurality of data transport protocols and is usable to identify file data to synchronize with the other processing device and determine a data transport protocol of the plurality of data transport protocols that is to be used to download/upload the particular file data. A processing device may generate a request for synchronization of file data. As an example, the request may be generated by a protocol client device intending to communicate with a protocol server device. The request may comprise identification that the request is generated using a particular file synchronization protocol, knowledge metadata including a compact representation of a version state that identifies file data associated with the processing device, and a request for a uniform resource identifier that the processing device can use to download the file data for synchronization. The request may be transmitted to another processing device such as the protocol server device, among other examples. In response to transmission of the request, a change batch response may be received. The change batch response may comprise: identification that the change batch response is generated using the particular file synchronization protocol, identification of particular file data for synchronization, instructions for accessing the particular file data including at least one uniform resource identifier for access to the particular file data, and instructions indicating at least one data transport protocol to utilize to obtain the particular file data, for example, when accessed using the uniform resource identifier. As an example, the uniform resource identifier may provide access to a storage associated with a protocol server. The particular file data may be downloaded (via the uniform resource identifier) using the data transport protocol identified in the change batch response. Further example, may comprise transmission of an indication that one or more files of the file data are synchronized with the client device. In one example, the indication comprises updated knowledge metadata. Additional communications between a processing device and another processing device may occur, for example, where additional requests and change batch responses may be exchanged to complete synchronization of file data.

In yet another example, a first processing device may interface with another processing device to synchronize file data via upload of the file data from the first processing device to a storage associated with the second processing device. A request for knowledge metadata that identifies a state of file data associated with the server device may be transmitted from the first processing device to the second processing device. As an example, a first processing device may be a protocol client device and a second processing device may be a protocol server device. The first processing device may receive the knowledge metadata, for example, from the second processing device. In response to receiving the knowledge metadata, the first processing device may generate a file synchronization request, wherein the file synchronization request identifies file data to synchronize with the second processing device. The file synchronization request may be transmitted to the second processing device. In response, the first processing device may receive, from the second processing device, a file synchronization response. The file synchronization response comprises data indicating a location to upload the file data, and instructions indicating at least one data transport protocol to utilize to upload the file data. Using the file synchronization response, the first processing device may upload the file data.

Non-limiting examples of the present disclosure further describe implementation of an exemplary synchronization protocol to identify file data for synchronization as well as negotiate how to achieve data transport for synchronization of the file data. In one example, a request for synchronization of data is received from a processing device. In response to receiving the request, a response is generated. The response may comprise: identification of file data for synchronization, instructions for accessing the file data and instructions indicating a data transport protocol to utilize to obtain the file data. The response may be transmitted to the processing device, for example, to enable the processing device to synchronize file data.

In other non-limiting examples of the present disclosure, an exemplary synchronization protocol is implemented to enable a processing device to synchronize file data with another processing device and/or distributed network. In one example, a request is transmitted for knowledge metadata that identifies a state of file data associated with a second processing device. The knowledge metadata may be received. In response, a file synchronization request may be generated that identifies file data to synchronize with the second processing device. A file synchronization response may be received from the second processing device. The file synchronization response may comprise data indicating a location to upload the file data, and instructions indicating at least one data transport protocol to utilize to upload the file data. The file synchronization response may be used to transmit the file data for upload, for example, to a storage associated with the second processing device.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims, or may be learned by the practice as set forth hereinafter.

BRIEF DESCRIPTION OF THE DRAWINGS

Non-limiting and non-exhaustive examples are described with reference to the following figures.

FIGS. 3A-3D illustrate exemplary computer architectures for synchronizing file data between computer systems with which aspects of the present disclosure may be practiced.

FIG. 4 illustrates an example method for file synchronization download using a synchronization protocol with which aspects of the present disclosure may be practiced.

DETAILED DESCRIPTION

Figure 1:
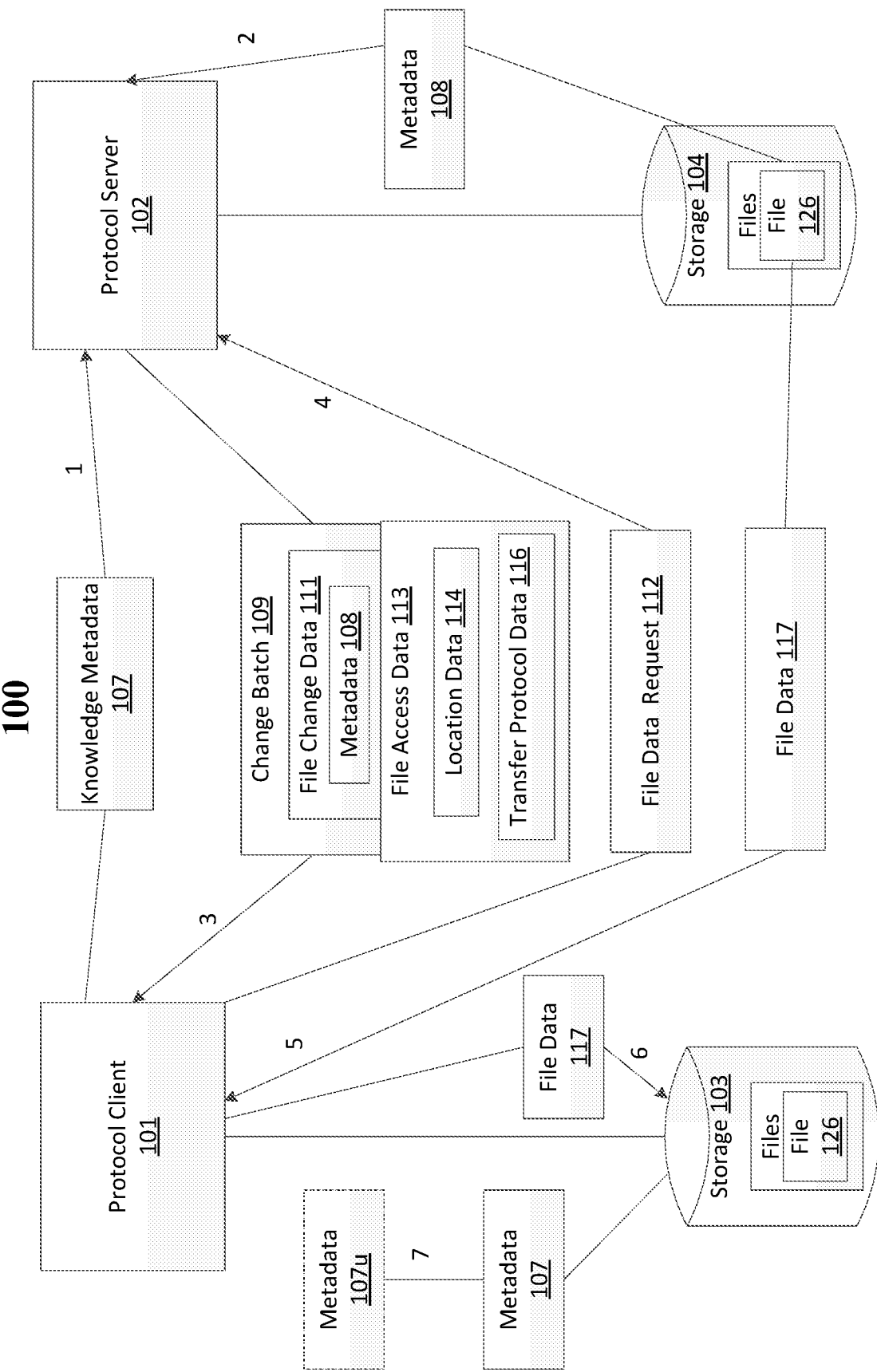
FIG. 1 illustrates an exemplary computer architecture for synchronizing file data between computer systems with which aspects of the present disclosure may be practiced.

Examples extend to methods, systems, and computer program products for synchronizing file data between processing devices using protocols. A protocol is a set of rules in which processing devices may utilize to communicate with each other. An exemplary synchronization protocol may be utilized to synchronize data between a protocol client and a protocol server. A protocol client is one or more processing devices that initiate a communication with one or more other processing devices. In one example, a protocol client may be a processing device such as a computer or server. In another example, a protocol client may be a distributed network (e.g., collection of remote devices) such as a cloud network, among other examples. A protocol server is one or more processing devices that receive a communication from a protocol client and generates a response to the communication. In one example, a protocol server may be a processing device such as a computer or server. In another example, a protocol server may be a distributed network (e.g., collection of remote devices) such as a cloud network, among other examples.

An exemplary synchronization protocol is protocol that may be used to enable devices to communicate in order to negotiate what data needs to be transferred between processing devices and further identify what data transport protocol to use to transfer the data between devices. Consider an example where it is determined that 3 files, from a file system comprising 100,000 files, are to be updated for synchronization between processing devices. An exemplary synchronization protocol may be established communication to identify how those 3 files can be synchronized between processing devices. The synchronization protocol executes a sequence of processing operations for enabling devices to communicate to enable data transport between processing devices. Processing devices may utilize different data transport protocols to transfer data between devices. A data transport protocol is a protocol used to transfer data between processing devices. A data transport protocol may be a standardized format for transferring data such as file data, where a data transport protocol may specify how data transfer should occur, for example, to complete data synchronization between processing devices. Exemplary data transport protocols may comprise but are not limited to: file transfer protocol (FTP), secure shell protocol (SSH), hypertext transfer protocol (HTTP), HTTP secure (HTTP/S), simple mail transfer protocol (SMTP), file service protocol (FSP), SSH file transfer protocol (SFTP), FTP over secure sockets layer (SSL) (FTPS) and trivial file transfer protocol (TFTP), among other examples. Examples described herein are not limited to any specific data transport protocols. That is, an exemplary synchronization protocol described herein is not limited to transfer of data using a single data transport protocol. A synchronization protocol is configured to be extensible to work with a plurality of different data transport protocols. In some examples, more than one data transport protocol is used to synchronize data. For instance, in an example where three files are being synchronized, a first file may be transferred using a first data transport protocol and the two other files may be transferred using a different data transport protocol. Issues may during data transfer when a processing device is unaware of a data transport protocol being utilized by another device. In some examples, processing devices sending/receiving data may not be configured to work with certain data transport protocols. An exemplary synchronization protocol is implemented to identify file data for synchronization, instruct a protocol client where to access file data for transmission (e.g., download/upload file data), and instruct a protocol client what data transport to use when transmitting file data, among other examples.

For instance, a protocol client may initiate synchronization of file data through communication with a protocol server. The protocol server may be associated with one or more storages/storage devices that maintain data over a distributed network, for example. As an example, an exemplary synchronization protocol may be established between a protocol client and protocol server to enable a protocol client to communicate with a storage/storage device to synchronize file data with the storage/storage device. The synchronization protocol can be used to synchronize file data and synchronization metadata between processing devices such as a protocol client and a protocol server. Synchronization metadata is exchanged between a protocol client and protocol server to facilitate synchronization. File data includes file metadata and file content (a data stream). File metadata can include file name, timestamps, attributes, etc. However, a synchronization protocol is separate from transfer protocols used to transfer file data. As such, the synchronization protocol can coordinate the use of different mechanisms/other protocols for transferring file data. For example, in one aspect, the synchronization protocol sends a Uniform Resource Identifier (URI) that a protocol client may utilize to access file data. In one example, the URI may be a Uniform Resource Locator (URL). The protocol client contacts the URL to get the file data, which can be hosted at a separate service. The synchronization protocol can also send an indication of what data transport protocol to use. That is, the synchronization protocol indicates how to properly use the URL. As an example, the synchronization protocol supports an arbitrary topology of HTTP clients and servers. The synchronization protocol may be configured to accommodate both a single server topology as well as an arbitrary number of servers (e.g., in a data center and/or a cloud) that synchronize the file data set between one another as well as to corresponding clients.

In examples described herein, data transfer is differentiated from the synchronization of processing devices for the transfer of data. As mentioned above, different processing devices may be configured to work with (or prefer to transfer data) using a particular data transport protocol. For instance, a client device may be configured to work with HTTP whereas a storage device that the client device is synchronizing with may be configured to work with another data transport protocol such as HTTPS or FTP. Examples described herein may extend to synchronization of a processing device through download of file data (e.g., protocol client downloads file data to synchronize with processing device/network) as well as synchronization of one or more processing devices through an upload of data (e.g., protocol client uploads file data to synchronize with processing device/distributed network). However, an exemplary synchronization protocol is not limited to download/upload of data and is applicable to any data transfer between a protocol client and a protocol server. As identified above, an exemplary synchronization protocol may extend to any example related to transmission of data between processing devices.

An exemplary synchronization protocol utilizes knowledge data to identify what file data is needed in order to synchronize at least one protocol client and at least one protocol server. In present examples, knowledge metadata may comprise a compact representation of file data associated with one or more processing devices such as a protocol client. An exemplary compact representation may comprise at least one of vector clocks and Lamport timestamps, among other examples. However, metadata for a compact representation of file data on a processing device is not limited to such examples. Knowledge metadata may be updatable, for example, where a modification of file data (e.g., through synchronization) may result in an updated compact representation for a processing device. A compact representation of file data known by a processing device contains metadata relative to a variety of devices or nodes across networks, enabling a protocol client to synchronize with different processing devices of a distributed network (or multiple distributed networks) regardless of form factor of a processing device. In this way, knowledge metadata may be used to efficiently synchronize a processing device with a plurality of nodes across different networks.

Furthermore, an exemplary synchronization protocol is extensible. In one example, a synchronization protocol is configured to enable modification of file metadata (e.g., synchronization may result in additional data/metadata per file). In another example, a synchronization protocol is configurable to integrate with any of a plurality of authentication schemes, for example, to authenticate protocol clients and protocol servers.

Accordingly, the present disclosure provides a plurality of technical advantages including but not limited to: implementation of a synchronization protocol that can interface with a plurality of data transport protocols, ability to separate synchronization data and from data transport, more efficient operation of a processing device executing data transfer across applications (e.g., saving computing cycles/computing resources), more efficient communication between devices during file synchronization (e.g., less renegotiation between devices to synchronize file data) ability to work with devices in a variety of form factors, a synchronization protocol that supports arbitrary topologies for data transfer, extensibility when working with file data for synchronization including an ability to modify metadata associated with a file being synchronized, synchronization protocols that can support any authentication scheme for authentication of a client/server relationship, and a reduction in latency for synchronization between devices and file transfer, among other examples.

Implementations may comprise or utilize a special purpose or general-purpose computer including computer hardware, such as, for example, one or more processors and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the various described aspects can be practiced in network computing environments with many types of computer system configurations, including, data centers, personal computers, desktop computers, laptop computers, message processors, handheld devices, wearable devices, multi-processor systems, microprocessor-based or programmable consumer electronics, network PCs, minicomputers, mainframe computers, mobile telephones, PDAs, tablets, pagers, watches, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in a distributed network environment. One example of a distributed network environment is a cloud computing environment. However, one skilled in the art should recognize that a distributed network is not limited to the example of a cloud computing environment. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Aspects of the invention include a sequence of protocol commands and corresponding protocol parameters for a synchronization protocol. Any of first, second and third parties may implement a client side and/or a server side of the synchronization protocol to interface with file storage solutions. A set of files to be synchronized can be identified based on a transmission of metadata in the form of a compact representation of what is known by a processing device.

FIG. 1 illustrates an example computer architecture 100 for synchronizing file data between computer systems. Referring to FIG. 1, computer architecture 100 includes protocol client 101, protocol server 102, storage 103, and storage 104. Protocol client 101, protocol server 102, storage 103, and storage 104 can be connected to (or be part of) a network, such as, for example, a Local Area Network ("LAN"), a Wide Area Network ("WAN"), and even the Internet. Accordingly, protocol client 101, protocol server 102, storage 103, and storage 104 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network. Communication between a protocol client and a protocol server may be authenticated using any type of authentication scheme. An exemplary synchronization protocol is configurable to interface with any type of authentication scheme, for example, where establishment of a communication channel for the synchronization protocol may authenticate a protocol client and/or protocol server through an authentication scheme.

In the depiction of FIG. 1, lead lines are numerically labeled (e.g., 1-7) to aid understanding in viewing FIG. 1.

In one aspect, protocol client 101 may be connected with storage 103 over a uniform resource identifier (URI) such as a local link, among other examples. For instance, protocol client 101 can be running on a computer system and storage 103 may be contained in the same computer system. In another aspect, protocol client 101 can be running in a cloud computing environment and storage 103 may be contained in the same cloud computing environment. In a further aspect, protocol client 101 can be running in one cloud computing environment and storage 103 is contained in a different cloud computing environment. Other arbitrary configurations of and relationships between protocol server 101 and storage 103 are also possible.

Protocol server 102 is configurable to be connected with storage 104. For example, protocol server 102 can be running in a cloud computing environment and storage 104 may be contained in the same cloud computing environment. In another aspect, protocol server 102 can be running on a computer system and storage 104 may be contained in the same computer system. In a further aspect, protocol server 102 can be running in one cloud computing environment and storage 104 is contained in a different cloud computing environment. Other arbitrary configurations of and relationships between protocol server 102 and storage 104 are also possible.

In general, computer architecture 100 can be used transfer file data from protocol server storage to protocol client storage. From the perspective of protocol client 101, file data is downloaded from protocol server storage to protocol client storage. Communication is initiated by protocol client 101. As an example FIG. 1 describes synchronization of a protocol client 101, where the protocol client 101 is initiating action to obtain file data from the protocol server 102 for synchronization. As an example, protocol client 101 may be trying to download file data from protocol server 102 to obtain file data that protocol client 101 does not already have. A synchronization protocol may be launched between processing devices, for example, through an initial communication between a protocol client 101 and a protocol server 102. A connection for the particular synchronization protocol may be established between processing devices, for example, a protocol client and a protocol server. In one exemplary scenario, a protocol client 101 seeks to synchronize file data with a protocol server 102 through download of particular file data. An initial communication may be a request for data synchronization with a protocol server 102, where the request may comprise one or more of: 1) identification of an exemplary synchronization protocol; 2) metadata (e.g., knowledge metadata) such as a compact representation of a file state of protocol client 101; and a request for a uniform resource identifier that the client device can use to download the file data for synchronization. In one example, a request may comprise identification of a particular file synchronization protocol and knowledge metadata indicating a file state of file data managed by the protocol client 101. As previously described, protocol client 101 generate and maintain knowledge metadata 107. Knowledge metadata 107 may include a compact representation of the version state of files 106A associated with protocol client 101. An exemplary compact representation may comprise one or more of vector clocks and Lamport timestamps, among other examples. However, metadata for a compact representation of file data on a processing device is not limited to such examples. Protocol client 101 may send knowledge metadata 107 to protocol server 102 (See e.g., lead line "1" of FIG. 1). Using the synchronization protocol, protocol server 102 may receive knowledge metadata 107 from protocol client 101 and utilize the metadata (e.g. compact representation of file data for the protocol client 101) to identify a state of file data for protocol client 101. Processing operations may be performed to determine what file data is needed for the protocol client 101 to synchronize with the protocol server 102. In doing so, protocol client may compare knowledge metadata 107 to metadata 108 maintained by protocol client 102. Metadata 108 may be obtained from one or more storages associated with protocol client 102, for example, storage 104 (See e.g., lead line "2" of FIG. 1).

In response to a received communication from a protocol client 101, protocol server 102 may generate a change batch 109 (See e.g., lead line "3" of FIG. 1). An exemplary change batch is a response to the request from the protocol client 101, where the protocol server 102 may evaluate and process the received knowledge metadata 107 to determine file data that the protocol client 101 needs for synchronization. A change batch 109 may comprise one or more of: 1) identification of an exemplary synchronization protocol; 2) a list of file data for the protocol client 10 to obtain/modify; 3) metadata for files are to synchronized with the protocol client 101; 4) instructions for where to access (e.g., URI/URL link to connect with one or more storages of a distributed network) file data; and 5) instructions indicating one or more data transport protocols to utilize in the transfer of file data between a storage associated with a protocol server 102 and a storage associated with a protocol client 101. In one example, change batch 109 may comprise file change data 111 and file access data 113. File change 111 further includes metadata 108 associated with files of a storage 104 for the protocol server 102. File access data 113 further includes location data 114 and transfer protocol data 116. Location data 114 comprises instructions for where to access (e.g., URI/URL link to connect with one or more storages of a distributed network) file data. Transfer protocol data 116 comprises instructions indicating one or more data transport protocols to utilize in the transfer of file data. As identified above, protocol server 102 may generate change batch 109 by executing processing operations that compare knowledge metadata 107 received to metadata 108. Change batch 109 identifies file change 111 not previously known to protocol client 101. File change 111 is related to file 126 as stored in storage 104. In another aspect, change batch 109 identifies file change data 111 along with one or more other files changes. The one or more other files changes may be changes to files in files 106B. Alternately, change batch 109 may contain no file changes (i.e., change batch 109 is an empty batch). A file change may be a change to file content (modify, create, delete) and/or file metadata (file name, file storage location, directory, file size, access attributes, etc.). Protocol server 102 may be configured to send change batch 109 to protocol client 101. Protocol client 101 may receive change batch 109 from protocol server 102.

Change batch 109 indicates files data to be modified and/or added to storage 103 associated with protocol client 101. Protocol client 101 may utilize change batch 109 to initiate a file data request 112 to retrieve file data from a storage (e.g. storage 104) associated with protocol server 102 (See e.g., lead line "4" of FIG. 1). The file data request 112 may utilize data from change batch 109 to access storage 104. Protocol client 101 may use location data 114 (the location of file 126 at storage 104) and transfer protocol data 116 to download file data 117 from storage 106B, in one example. Transfer protocol data 116 may be a data transport protocol compatible with storage 104. Transfer protocol data 116 may be determined using an exemplary synchronization protocol, where such data may be maintained by protocol server 102 or obtained through communication with one or more other processing devices/storages associated with such processing devices.

In response to processing operations associated with evaluating a change batch 109, protocol client 101 may utilize the change batch 109 to access file data and obtain (e.g. download) the file data to synchronize protocol client 101 with one or more storages of protocol server 102. File data 117 may be transmitted from storage 104 to protocol client 101 (and associated storage) for synchronization purposes (See e.g., lead line "5" of FIG. 1). In some examples, file data 117 received by protocol client 101, for example to update file 126, may comprise additional content (e.g. data stream) and one or more fields of additional metadata as compared to file data previously stored by protocol client 101 (e.g., file 126). File data 117 may be stored in storage 103 associated with protocol client 101 (See e.g., lead line "6" of FIG. 1). In some examples, processing operations occur where notification of commitment of data is transmitted from the protocol client 101 to the protocol server 102. However, some examples may not include notification of committed data. For example, the protocol client 101 may update its knowledge metadata 107 to knowledge metadata 107u, being an updated compact representation of what is known and/or stored upon the protocol client 101 (See e.g., lead line "7" of FIG. 1). In examples, the knowledge metadata 107/107u is not limited to knowledge data for a particular protocol client/protocol server relationship. That is, knowledge metadata 107/107u may be utilized to update different topologies of client/server relationships. Knowledge metadata 107 and updated knowledge metadata 107u provide an advantage over mere timestamp data that relates to an update performed with respect to a particular client/server relationship, where knowledge metadata described herein may be utilized by a plurality of different topologies to initiate synchronization of data. In one example, protocol client 101 may execute processing operations to commit metadata 108 and file data 117 to storage 103. Committing metadata 108 and file data 117 to storage 103 synchronizes files 106A with files 106B. One example of committing metadata may comprise the protocol client 101 updating knowledge metadata 107 to knowledge metadata 107u, as described above. If an error occurs during synchronization, the synchronization protocol may generate communications indicating error and re-start processing to synchronize data, for example, download of file data to the protocol client 101.

Figure 2:
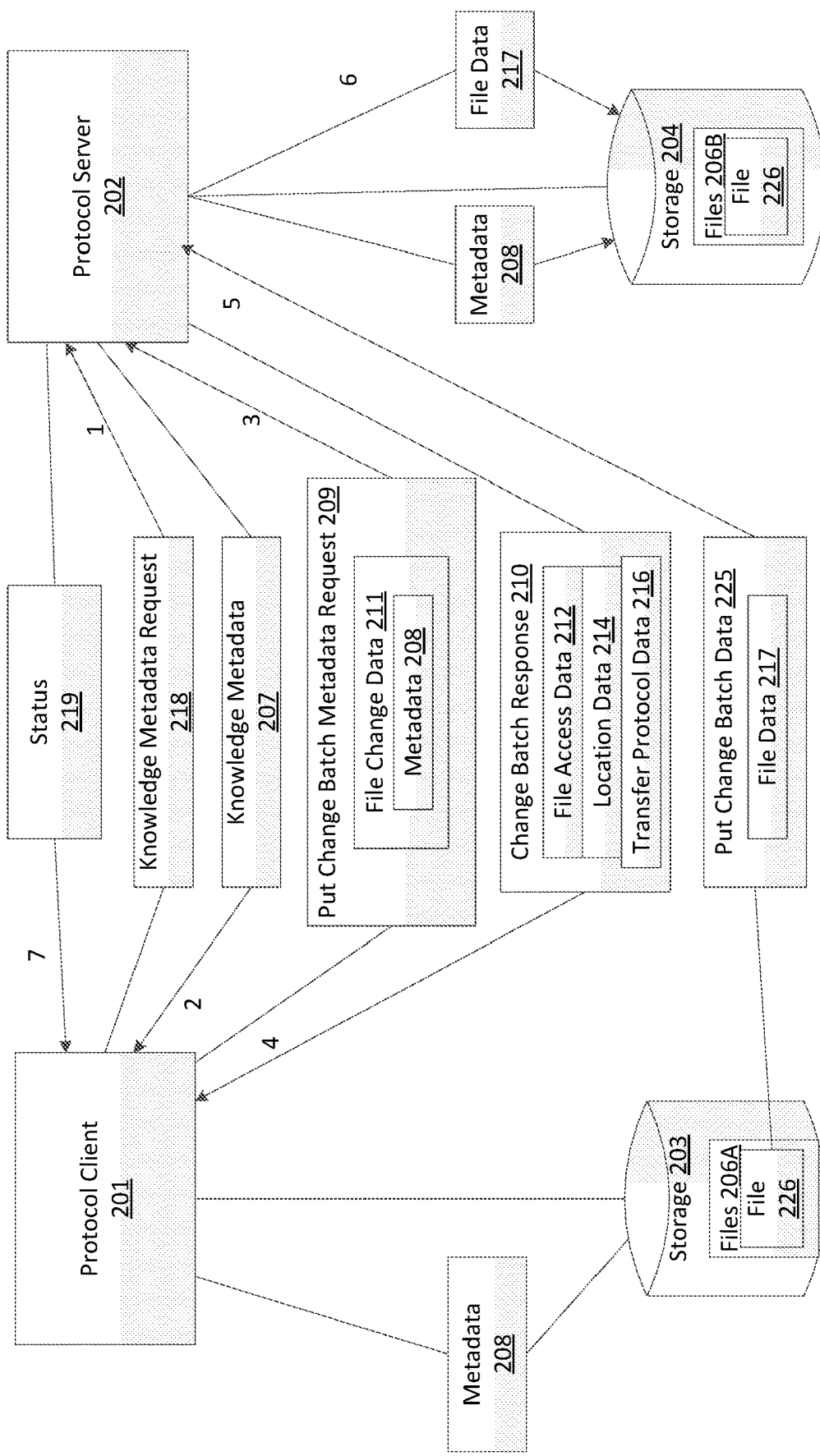
FIG. 2 illustrates an exemplary computer architecture for synchronizing file data between computer systems with which aspects of the present disclosure may be practiced.

Turning to FIG. 2, FIG. 2 illustrates an example computer architecture 200 for synchronizing file data between computer systems. Referring to FIG. 2, computer architecture 200 includes protocol client 201, protocol server 202, storage 203, and storage 204. Protocol client 201, protocol server 202, storage 203, and storage 204 can be connected to (or be part of) a network, such as, for example, a Local Area Network ("LAN"), a Wide Area Network ("WAN"), and even the Internet. Accordingly, protocol client 201, protocol server 202, storage 203, and storage 204 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network. A computer system can switch between protocol client functionality and protocol server functionality or can implement protocol client functionality and protocol server functionality simultaneously. Communication between a protocol client and a protocol server may be authenticated using any type of authentication scheme. An exemplary synchronization protocol is configurable to interface with any type of authentication scheme, for example, where establishment of a communication channel for the synchronization protocol may authenticate a protocol client and/or protocol server through an authentication scheme.

In the depiction of FIG. 2, lead lines are numerically labeled (e.g., 1-7) to aid understanding in viewing FIG. 2.

In one aspect, protocol client 201 can be connected to storage 203 over or a URI, for example, a local link or URL. For instance, protocol client 201 can be running on a computer system and storage 203 may be contained in the same computer system. In another aspect, protocol client 201 may be running in a cloud computing environment and storage 203 can be contained in the same cloud computing environment. In a further aspect, protocol client 201 may be running in one cloud computing environment and storage 203 is contained in a different cloud computing environment. Other arbitrary configurations of and relationships between protocol server 201 and storage 203 are also possible.

Protocol server 202 is associated with storage 204. For example, protocol server 202 may be running in a cloud computing environment and storage 204 can be contained in the same cloud computing environment. In another aspect, protocol server 202 may be running on a computer system and storage 204 may be contained in the same computer system. In a further aspect, protocol server 202 may be running in one cloud computing environment and storage 204 is contained in a different cloud computing environment. Other arbitrary configurations of and relationships between protocol server 202 and storage 204 are also possible.

In general, computer architecture 200 can be used transfer file data from protocol client storage to protocol server storage, for example, where data is uploaded to a protocol server from a protocol client in order to synchronize data between the protocol client and the protocol server. From the perspective of protocol client 201, file data is uploaded from protocol client storage to protocol server storage. Communication is initiated by protocol client 201.

Protocol client 201 can send knowledge metadata request 218 to protocol server 202 (See e.g., lead line "1" of FIG. 2). Examples of knowledge metadata request 218 may comprise a request for knowledge metadata from protocol server 202, to initiate processing where protocol server 202 may send, to protocol client 201, its view of data stored upon protocol server 202 and/or a processing device associated with protocol server 202. Protocol server 202 may receive knowledge metadata request 218 from protocol client 201. In response, protocol server 202 may send knowledge metadata 207 to protocol client 201 (See e.g., lead line "2" of FIG. 2). Knowledge metadata 207 can include a compact representation of the version state of files 206B. Protocol client 201 can receive knowledge metadata 207 from protocol server 202.

Protocol client 201 may compare knowledge metadata 207 to metadata 208 to identify any differences in knowledge between protocol client 201 and protocol server 202 (e.g., differences between file 226 at storage 203 and file 226 at storage 204). The differences may be represented in metadata subset 228. However, even when file data for synchronization is identified, protocol client 201 is still unaware of where to upload file data/metadata for synchronization because of potential protocol differences between a protocol client 201 and a protocol server 202. Among other things, protocol client 201 may not be able to identify where to upload files or what data transport protocol to utilize in order to upload file data to a particular location associated with protocol server 202. Thus, an exemplary synchronization protocol may be utilized to coordinate synchronization between protocol client 201 and protocol server 202.

As an example, protocol client 201 may generate a put change batch metadata request 209 to indicate to protocol server 202 that protocol client 201 has file data it wants to synchronize with protocol server 202 (See e.g., lead line "3" of FIG. 2). For instance, protocol client 201 may have identified that it has 5 files to synchronize with protocol server 202. The put change batch metadata request 209 may comprise identification of: 1) file data to be uploaded to protocol server 202 including file metadata; 2) a request for a location to upload particular file data; and 3) request for what data transport to utilize to upload particular file data. In one example, the put change batch metadata request 209 may comprise metadata subset 228. For instance, metadata subset 228 may comprise metadata for the 5 files that protocol client 201 desires to upload to protocol server 202. Protocol server 202 can use metadata subset 228 to determine location data 214 (of file 226 at storage 204) and transfer protocol data 216 for file 226.

Protocol server 202 may generate a change batch response 210, where the change batch response 210 is a response to the put change batch metadata request 209 received from the protocol client 201 (See e.g., lead line "4" of FIG. 2). An exemplary change batch response 210 comprises data to enable the protocol client 201 to upload file data to storage (e.g., storage 204) associated with protocol server 202. The change batch response 210 may comprise information file access data 212 that includes location data 214 and transfer protocol data 216. Location data 214 may comprise data related to where to transmit file data for synchronization with protocol server 202. In one example location data 214 may comprise a link to a storage/directory associated with protocol server 202. Transfer protocol data 216 may comprise data for a data transport protocol to utilize to synchronize data between the protocol client 201 and the protocol server 202, for example, during upload of file data from the protocol client 201.

Protocol client 201 may receive the change batch response 210. With knowledge of file access data 212, protocol client 201 can upload file data 217 using at least location data 214 and transfer protocol data 216. File data 217 may be uploaded directly to storage 204 or may be uploaded to an intermediary storage server that handles storing the data in storage 204.

The protocol client 201 may generate put change batch data 225 indicating that the protocol server 202 may commit uploaded data (See e.g., lead line "5" of FIG. 2). The put change batch data 225 indicates that file data upload has been completed and requests commitment of the file data to a storage associated with protocol server 202. In response, protocol server 202 may commit metadata 208 to storage 204 and cause file data 217 to be committed storage 204 (e.g., through communication with an intermediary storage service) (See e.g., lead line "6" of FIG. 2). In some examples, file data 217 received by protocol server 202, for example to update file 226, may comprise additional content (e.g. data stream) and one or more fields of additional metadata as compared to file data previously stored by protocol server 202 (e.g., file 226). Protocol server 202 may send status 219 to protocol client 201 to indicate that metadata 208 and file data 217 were committed (See e.g., lead line "7" of FIG. 2). In some examples, errors may occur during uploading of file data between the protocol client 201 and the protocol server 202. Examples herein may commit only successfully uploaded file data. If an error occurs during synchronization, the synchronization protocol may generate communications indicating error and re-start processing to synchronize data. For instance, say an upload is to occur to upload 3 files from the protocol client 201 to the protocol server 202 and 2 of the 3 files is successfully uploaded. Protocol server 202 may commit the two files and re-send communications (e.g., knowledge metadata) for the protocol client 101 to re-upload the third file.

Figure 3A:
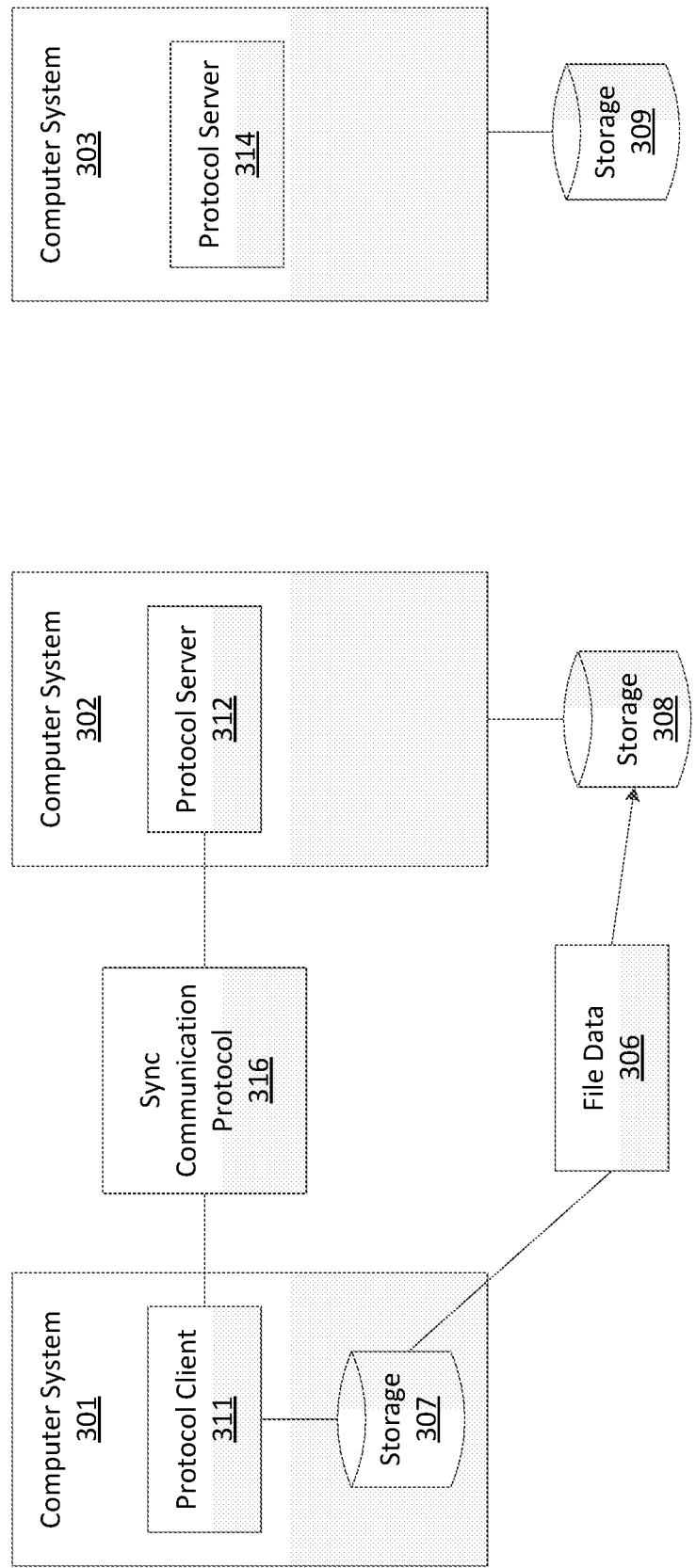

FIGS. 3A-3D illustrate an example computer architecture 300 for synchronizing file data between computer systems. Turning to FIG. 3A, computer architecture 300 includes computer systems 301, 302, and 303 and storage 307, 308, and 309. Computer systems 301, 302, and 303 and storage 307, 308, and 309 can be connected to (or be part of) a network, such as, for example, a Local Area Network ("LAN"), a Wide Area Network ("WAN"), and even the Internet. Accordingly, computer systems 301, 302, and 303 and storage 307, 308, and 309 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, computer systems 301, 302, 303 and storage 307, 308, and 309 can be running in any environment. As depicted, computer system 301 includes protocol client 311 and is associated with storage 307. Protocol client 311 can be associated with storage 307 over or a local link or network connection. For example, protocol client 311 and storage 307 can be connected by a system bus at computer system 301, can be connected in the same data center, connected over the Internet, etc. Computer system 302 includes protocol server 312 and is associated with storage 308. Protocol server 312 can be associated with storage 308 or a local link or network connection. For example, protocol server 312 and storage 308 can be connected by a system bus at computer system 302, can be connected in the same data center, connected over the Internet, etc.

Computer system 303 includes protocol server 314 and is associated with storage 309. Protocol server 314 can be associated with storage 309 or a local link or network connection. For example, protocol server 314 and storage 309 can be connected by a system bus at computer system 303, can be connected in the same data center, connected over the Internet, etc.

In one aspect, protocol server 312 and protocol server 314 are running in the same cloud computing environment. In another aspect, protocol server 312 and protocol server 314 are running in different cloud computing environments. In one aspect, storage 308 and storage 309 are in the same cloud computing environment. In another aspect, storage 308 and storage 309 are in different cloud computing environments.

Other arbitrary configurations of and relationships between protocol client 301, protocol servers 302 and 303, and storage 308 and 309 are also possible.

Based on prior configuration, protocol client 311 can be configured to synchronize with protocol server 312. Protocol client 311 and protocol server 312 can exchange sync protocol communication 316. Sync protocol communication 316 may be a communication channel for protocol client 311 and protocol server 312 to initiate synchronization of file data. Based on sync protocol communication 316, transfer protocol 331 can then be used to send (upload) file data 306 from storage 307 to storage 308.

Figure 3B:
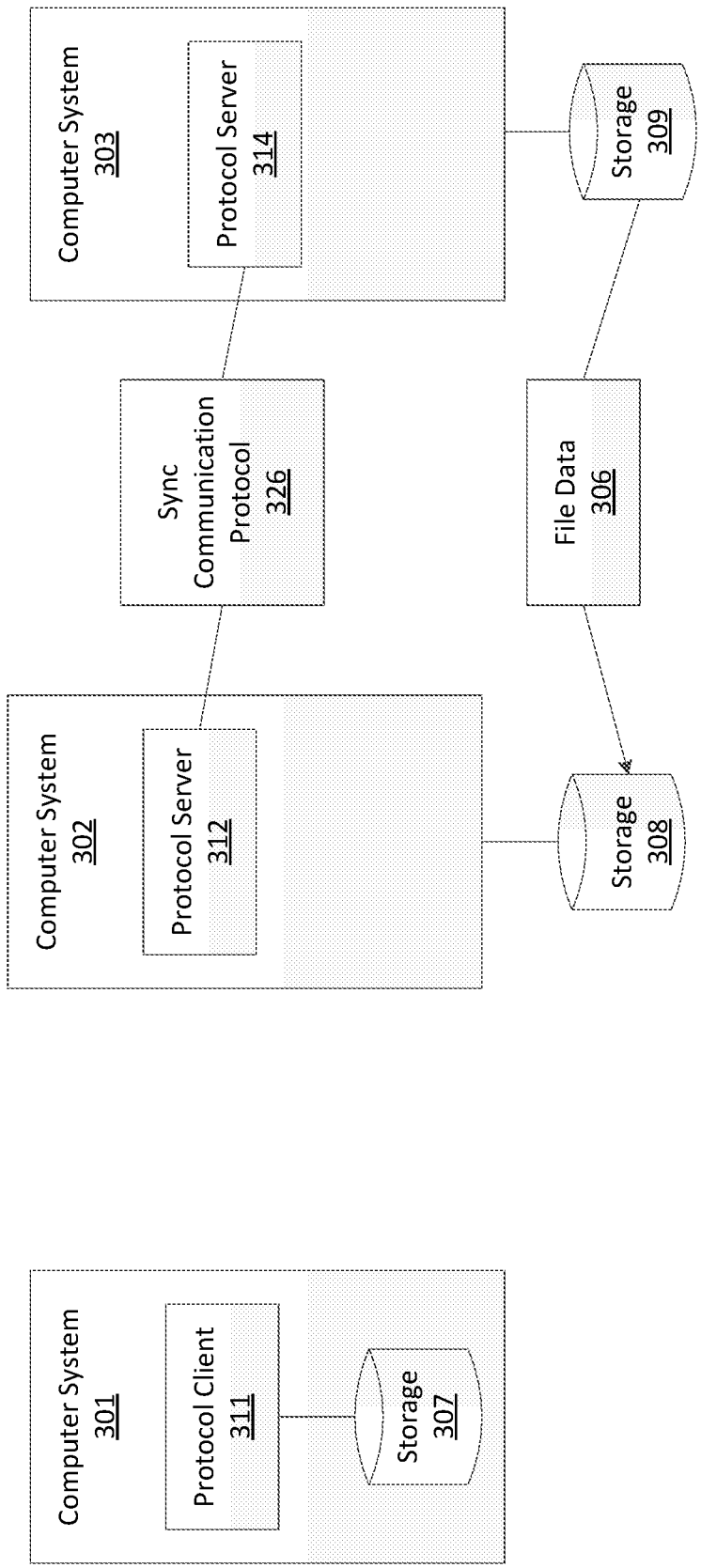

Turning to FIG. 3B, computer system switches to implement protocol client 313. Protocol client 313 and protocol server 314 can exchange sync protocol communication 326. Sync protocol communication 326 may be a communication channel for protocol client 313 and protocol server 314 to initiate synchronization of file data. Based on sync protocol communication 326, transfer protocol 332 can then be used to send (upload) file data 306 from storage 308 to storage 309.

Figure 3C:
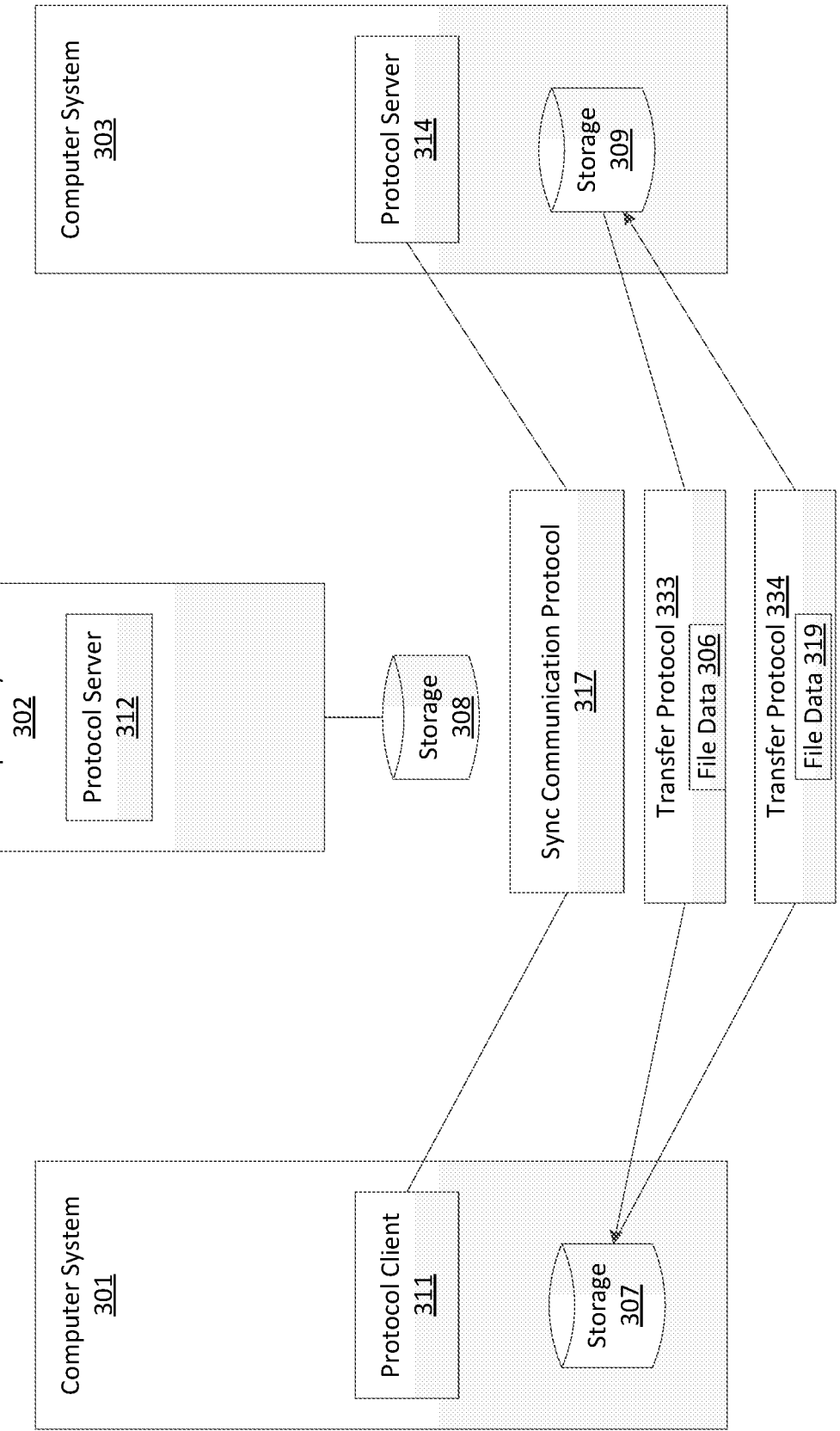

Turning to FIG. 3C, based on configuration change, protocol client 311 can be configured to synchronize with protocol server 314. Protocol client 311 and protocol server 314 can exchange sync protocol communication 317. Sync protocol communication 317 may be a communication channel for protocol client 311 and protocol server 314 to initiate synchronization of file data. Based on sync protocol communication 317, transfer protocol 333 can then be used to send (download) file data 306 from storage 309 to storage 307. Alternately and or and/or in combination, transfer protocol 334 can be used to send (upload) file data 319 from storage 307 to storage 309. File data 319 can be file data generated at computer system 301 subsequent to sync protocol communication 316. When considering FIG. 3A and FIG. 3C, it is identified that protocol client 311 may be communicating with different protocol servers, e.g. protocol server 312 and protocol server 314, to synchronize file data. That is, protocol client 311 may synchronize file data to with a first protocol server 312 (e.g., in a first cloud computing region) and then turn around and synchronize file data with another protocol server 314 (e.g., in a second cloud computing region). In doing so, a certain amount of renegotiation typically occurs for first synchronization between the protocol client 311 and respective protocol servers. Such renegotiation may typically include numerous back and forth interactions or large files of knowledge data indicating what is known, which may be time consuming to parse. In other instances, file data may be stored across multiple protocol servers. In such instances, synchronization may be difficult when a protocol server (e.g., protocol server 314) is unaware of an update to protocol server 301 by another protocol server (e.g., protocol server 312). In present examples, knowledge metadata (e.g., compact representation of what protocol client 311 knows) may be used to enable a protocol client to immediately turn around and synchronize with different protocol servers (e.g., protocol server 312 and protocol server 314) without the need for large scale renegotiation with respective protocols servers. As described above, knowledge metadata (and updated knowledge metadata after update to a protocol client) may contain metadata relative to a variety of devices or nodes across networks.

In another example, no changes to files in storage 307 occur subsequent to sync protocol communication 316. Turning to FIG. 3D, protocol server 314 can use sync protocol communication 341 to send empty batch 321 (e.g., when protocol client 311 initiates a download) to protocol client 311. Alternately, protocol client 311 can use sync protocol communication 342 to send empty batch 322 (e.g., when protocol client 311 initiates an upload) to protocol server 314. An empty batch indicates that files in storage 307 and corresponding files in storage 309 are synchronized.

Although protocol server 312 and protocol client 313 are depicted separately, computer system 302 can implement protocol server 312 along with protocol client 313 (e.g., simultaneously). Computer system 301 can also implement a protocol server (not shown) along with protocol client 311 (e.g., simultaneously). Computer system 303 can also implement a protocol client (not shown) along with protocol server 314 (e.g., simultaneously).

In one aspect, a computer system implements one or more (or a plurality of) protocol clients along with one or more (or a plurality of) protocol servers (e.g., simultaneously). As such, a computer system can participate in multiple instances of a synchronization protocol at essentially the same time. The multiple instances of a synchronization protocol can be used to synchronize file data with and/or between different computer systems.

FIG. 4 illustrates an example method 400 for file synchronization download using a synchronization protocol. As depicted, download flow 400 includes protocol client 401, protocol service 402, client storage 403, and (possibly multiple instances) server storage 404. Within FIG. 4, thicker lines (e.g., for POST Knowledge, Change Batch #1, Get Change Batch, and Change Batch #2) are part of a synchronization protocol. Narrower lines (e.g., for GET File #1 Data, File Data, GET File Data #2, Apply Batch #1, Apply Batch #, and Status) are part of a separate transfer protocol and internal batch processing on protocol client 401 and/or protocol server 402. A protocol client and a protocol service may establish communication for synchronization utilizing a synchronization protocol, as described previously.

Protocol client 401 sends knowledge to protocol service 402 using POST Knowledge request. As an example, a POST knowledge request is a transmission of knowledge metadata 107, for example, as described in FIG. 1. Protocol service 402 uses protocol client 401's knowledge and its own metadata to generate one or more change batches. An exemplary change batch is change batch 109, for example, as described in FIG. 1. A first change batch (Change Batch #1) is sent in response to POST Knowledge. If there are no changes to download, Change Batch #1 is empty.

Protocol client 401 inspects Change Batch #1. If Change Batch #1 is not empty, for each file in Change Batch #1, protocol client 401 determines if the file's data has changed and is to be downloaded. If so, protocol client 401 uses the file's location information in the metadata to download the new file data. Once the file data is downloaded, protocol client 401 applies the Change Batch #1 by committing file changes to Client Storage 403.

Protocol Client 401 updates its metadata according to information in the change batch. If there are not more change batches, download concludes. If there are more change batches, protocol client 401 downloads the next change batch (Change Batch #2) using GET Change Batch. Protocol client 401 can inspect and process Change Batch #2 similar to inspection and processing of Change Batch #2. It should be appreciated that examples describe herein extend to multiple requests/responses as multiple change batches may need to be processed in order to synchronize file data between processing devices.

Figure 5:
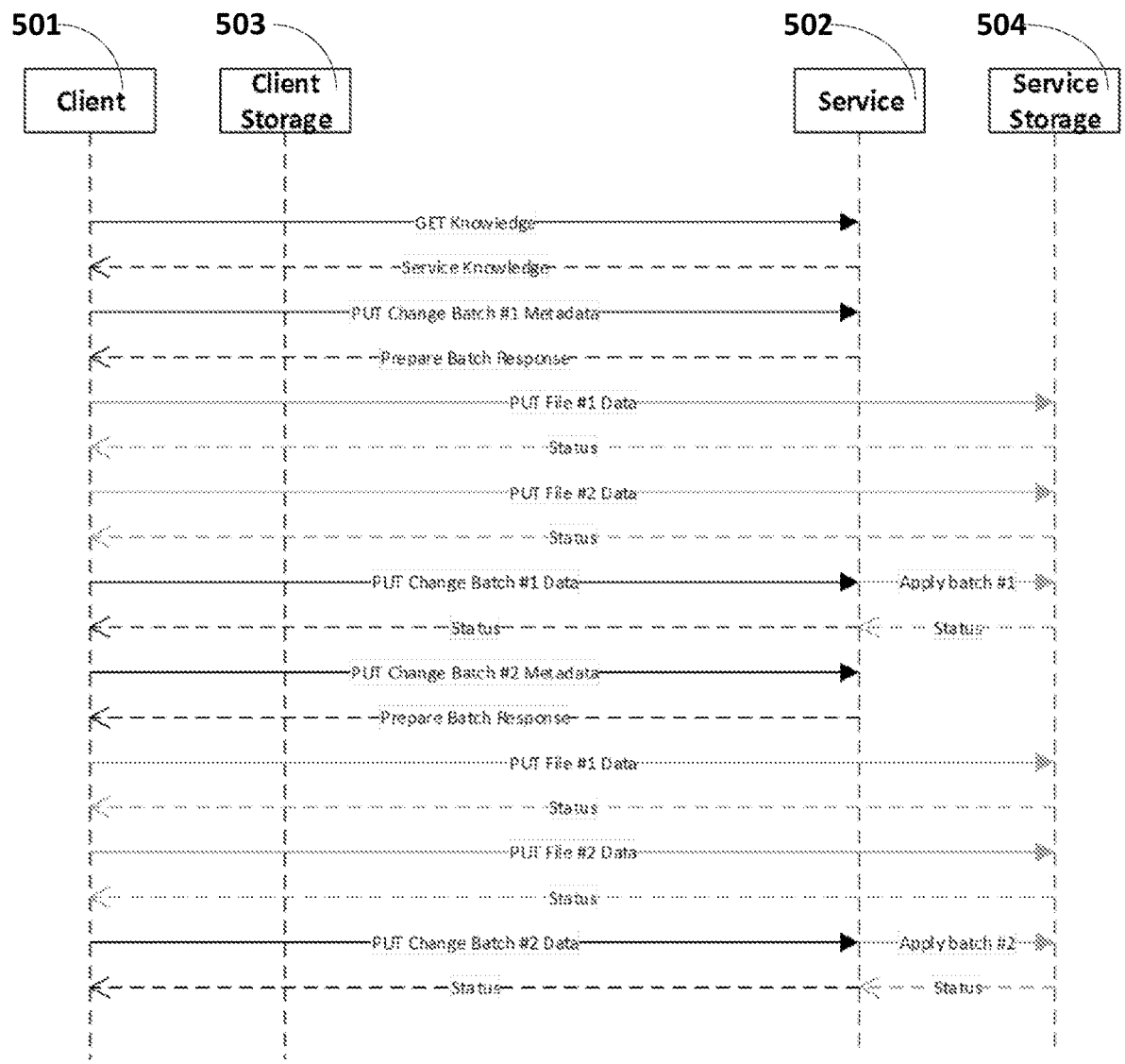
FIG. 5 illustrates an example method for file synchronization upload using a synchronization protocol with which aspects of the present disclosure may be practiced.

FIG. 5 illustrates an example method 500 for file synchronization upload using a synchronization protocol. As depicted, download flow 500 includes protocol client 501, protocol service 502, client storage 503, and service storage 504. Within FIG. 5, thicker lines (e.g., GET Knowledge, Service Knowledge, PUT Change Batch #1 Metadata, Prepare Batch Response, PUT Change Batch #1 Data, Protocol Server to Protocol Client Status, PUT Change Batch #2 Metadata, and PUT Change Batch #1 Data) are part of a synchronization protocol. Narrower lines (e.g., PUT File #1 Data, Service Storage to Protocol Client Status, PUT File #2 Data, Apply Batch #1, Apply Batch #2, and Service Storage to Protocol Server Status) are part of a separate transfer protocol and internal batch processing on protocol client 501 and/or protocol service 502. A protocol client and a protocol service may establish communication for synchronization utilizing a synchronization protocol, as described previously.

Protocol client 501 may transmit knowledge metadata to protocol service 502 using GET Knowledge request. An exemplary GET Knowledge request may be knowledge metadata request 218 as described in FIG. 2. Protocol service 502 may utilize the GET Knowledge request to provide a protocol client with Service knowledge (e.g. a Service knowledge response) for the protocol client to know a state of file data stored on at least one storage associated with protocol service 502. An exemplary Service knowledge response may be knowledge metadata 207 described in the description of FIG. 2. Protocol client 501 uses protocol service 502's service knowledge and its own metadata to generate one or more change batches. An exemplary change batch (e.g., PUT Change Batch #1 of FIG. 5) may be put change batch metadata request 209 as described in FIG. 2. If there are not changes to upload, the first change batch can be an empty batch.

Protocol client 501 informs protocol service 502 of a change batch using PUT Change Batch #1 Metadata request. Protocol service 502 inspects PUT Change Batch #1 Metadata request and sets up a location (e.g., in service storage 504) to upload new file data and respond to protocol client 501 with Prepare Batch Response. Prepare Batch Response includes necessary upload information. If the batch is not empty, for each file in the batch, protocol client 501 determines if protocol service 502 is to receive the file's data based a response from protocol service 502. If so, protocol client 501 uses the location sent by protocol service 502 to upload the file's data. Protocol client 501 transmits file data for upload using a Put Change Batch Data request (e.g. Put Change Batch #1 data of FIG. 5).

In one aspect, data transfer goes over a data transfer protocol, which may not be owned by protocol service 502. The data transfer can succeed or fail and can return a transfer status indicative of success or failure.

After that, a PUT change batch (a commit instruction) goes to the protocol service 502. Part of the payload of the PUT change batch is the per-file payload, which includes a transfer status (per file). Protocol service 502 applies the batch and uses the transfer status to determine if the files are to be applied or not. The files are not applied if the transfer status indicates failure.

For example, protocol client 501 instructs protocol service 502 to apply the batch using PUT Change Batch #1 Data Request. An exemplary Put Change Batch Request is put change batch data 225 as described in FIG. 2. Protocol service 502 commits new or changed data, if any, to storage (e.g., to service storage 504). Protocol service 502 also updates its metadata according to the information in the change batch and responds to protocol client 501 with the status.

If there are no more change batches, upload concludes. If there are more change batches, protocol client 501 uploads the next change batch (e.g., Put Change Batch #2 Metadata request). Protocol client 501 can inspect and process Put Change Batch #2 Metadata request similar to inspection and processing of Put Change Batch #1 Metadata request.

In some aspects, service storage (404 or 504) may be compatible with a plurality of different transfer protocols. If so, a protocol services (e.g., 402 or 502) can use synchronization protocol messages to make a protocol client (e.g., 401 or 501) aware of the plurality of different transfer protocols. The protocol client can then use a transfer protocol from among plurality of different transfer protocols to transfer (e.g., download or upload) file data between a protocol client and a storage location in service storage. It should be appreciated that examples describe herein extend to multiple requests/responses as multiple change batches may need to be processed in order to synchronize file data between processing devices.

Exemplary Parameter Commands for Exemplary Synchronization Protocol

The follow tables describe requests that are included in communication between a protocol client and protocol service (comprising a protocol server), where a protocol client is synchronizing file data via download:

POST Knowledge

| URI |  |
|---|---|
| sync/<version>/knowledge | |
| Query Parameters | |
| none | |
| Request Headers | |
| x-ms-partnership-id | partnership ID |
| x-ms-replica-id | replica ID |
| x-ms-epoch | epoch of the client replica (zero if there is no client replica yet) |
| x-ms-fullEnumLowerBound | SyncId of full enumeration lower bound, in the following format: "{Prefix}:{UniqueId}" (where "{Prefix}" and "{UniqueId}" are the string representations of the SyncId's "Prefix" and "UniqueId" fields, respectively |
| x-ms-maxFileSizeMB | maximum total size of files in the batch (in MB) supported for download by the client. The size is rounded to the next MB |
| x-ms-maxFileCount | maximum file count per batch |
| x-ms-device-id | unique identifier of the client device |
| x-ms-device-name | name of the client device |
| x-ms-client-correlation-id | string used by client for request identification |

Request Body

Binary MSF Knowledge

Response Headers

| | |
|---|---|
| x-ms-upload-download-result | URI where the client can upload the results of its download operations |
| x-ms-request-id | service-generated string that uniquely identifies the request |
| x-ms-batch | URI where the client can download the next generated change batch. Not present if this is the last batch |
| x-ms-epoch | epoch of the service replica |

Response Body

ChangeBatch

Status

| | |
|---|---|
| 200 - OK | First batch has been generated and returned. |
| 202 - Accepted | Request is pending |
| 400 - Bad Request | One or more of the request header is missing or invalid, or request body is invalid |
| 404 - Not Found | Replica identified by the partnership ID and replica ID was not found |

GET Change Batch

URI

Opaque, returned by POST Knowledge or last GET Change Batch requests

Query Parameters

Opaque, returned by POST Knowledge or last GET Change Batch Data requests

Request Headers

| | |
|---|---|
| x-ms-partnership-id | partnership ID |
| x-ms-replica-id | replica ID |
| x-ms-epoch | epoch of the client replica |
| x-ms-device-id | unique identifier of the client device |
| x-ms-device-name | name of the client device |
| x-ms-client-correlation-id | string used by client for request identification |

Request Body

None

Response Headers

| | |
|---|---|
| x-ms-request-id | service-generated string that uniquely identifies the request |
| x-ms-batch | URI where the client can download the next generated change batch. Not present if this is the last batch |

Response Body

ChangeBatch

Status

| | |
|---|---|
| 200 - Success | Batch metadata has been retrieved successfully |
| 202 - Accepted | Request is pending |
| 400 - Bad Request | One or more of the request header is missing or invalid. |
| 404 - Not found | Batch metadata is not yet ready, or There is no reference to this batch on the service |

In one aspect, a change batch is comprised of two parts: file metadata and a binary large object ("BLOB"). The file metadata format can be as follows:

ChangeBatchMetadata

| Entry | Type | Description |
|---|---|---|
| Files | Vector<FileMetadata> | See below for details |
| DeviceNames | Vector<string> | Names of the devices which generated the changes to the files in this batch |

FileMetadata

| Entry | Type | Description |
|---|---|---|
| FileId | SyncId | Unique ID of the file or directory. |
| FileVersion | SyncVersion | Version of the entry |
| StreamId | GUID | Version of the file content (not used for directories) |
| ParentId | SyncId | ID of the parent (always a directory entry) |
| Attributes | DWORD | Entry's file system attributes. File attributes can be metadata values stored by the file system on disk and are used by the system and are available to developers via various file I/O APIs |
| NamespaceChangeTime | EcsFileTime | Approximate time that the item's name or parent ID has changed Used for resolving conflicts |
| AttributeChangeTime | EcsFileTime | Approximate time that item's attributes have changed. Used for resolving conflicts |
| CreatedTime | EcsFileTime | File system time of the entry's creation |
| ModifiedTime | EcsFileTime | File system time of the entry's modification |
| FileSize | ULONGLONG | File size in bytes (zero for directories) |
| FileName | String | Name of the file or directory |
| DeviceNameIndex | USHORT | Zero-based index of the inside vector that identifies the entry's device name |
| FileUri | String | URI of the file |
| ETag | String | Electronic Identification of the file |
| Properties | Vector<FileMetadataProperty> | Array of custom metadata properties associated with the file |
| DataTransferHResult | LONG | Result of the data transfer |

SyncId

| Entry | Type | Description |
|---|---|---|
| Prefix | ULONGLONG | |
| UniqueId | GUID | |

SyncVersion

| Entry | Type | Description |
|---|---|---|
| LastUpdatingReplicaKey | ULONG | |
| TickCount | ULONGLONG | |

EcsFileTime

| Entry | Type | Description |
|---|---|---|
| LowDateTime | ULONG | Low 32 bits of 64-bit FILETIME value |
| HighDateTime | ULONG | High 32 bits of 64-bit FILETIME value |

FileMetadataProperty

| Entry | Type | Description |
|---|---|---|
| Name | String | Name of the property |
| Type | SyncMetadataFieldType | Type of the property |
| Value | String | Value of the property; The format depends on the Type value |

PUT Download Result

| URI |
|---|
| Opaque, returned by POST Knowledge in the x-ms-upload-download-result header |

| Query Parameters |
|---|
| Opaque, returned by POST Knowledge in the x-ms-upload-download-result header |

| Request Headers | |
|---|---|
| x-ms-partnership-id | Required: partnership ID |
| x-ms-replica-id | Required: replica ID |
| x-ms-device-id | Required: unique identifier of the client device |
| x-ms-device-name | Optional: name of the client device |
| x-ms-backup-id | Optional: backup ID (in case of a restore) |
| x-ms-client-correlation-id | Optional: string used by client for request identification |

| Request Body |
|---|
| DownloadResultRequest |

| Response Headers | |
|---|---|
| x-ms-request-id | service-generated string that uniquely identifies the request |

| Response Body |
|---|
| None |

| Status | |
|---|---|
| 201-Created | Request has been recoded |

DownloadResultRequest

| Entry | Type | Description |
|---|---|---|
| SuccessFileCount | UINT | Number of files successfully downloaded |
| TotalFileSizeInBytes | ULONGLONG | Total size, in bytes, of files downloaded |
| SessionRuntimeInMs | UINT | Duration, in milliseconds, of the download session |
| ErrorItemStatus | Vector<PerItem DownloadStatus> | Array of download status entries, one entry for each file |

PerItemDownloadStatus

| Entry | Type | Description |
|---|---|---|
| SyncId | SyncId | Sync ID of the file |
| Data TransferHResult | INT | Error code of download operation |
| HttpStatusCode | Int | HTTP status of the response from Azure file storage |
| RequestId | String | Request ID received in the response from Azure file storage |

The follow tables describe requests that are included in communication between a protocol client and protocol service (comprising a protocol server), where a protocol client is synchronizing file data with a protocol service via upload:

GET Knowledge

| URI |
|---|
| sync/<version>/knowledge |

| Query Parameters |
|---|
| none |

| Request Headers | |
|---|---|
| x-ms-partnership-id | partnership ID |
| x-ms-replica-id | replica ID |
| x-ms-epoch | epoch of the client replica (zero if there is no client replica yet) |
| x-ms-device-id | unique identifier of the client device |
| x-ms-device-name | name of the client device |
| x-ms-client-correlation-id | string used by client for request identification |

| Request Body |
|---|
| none |

| Response Headers | |
|---|---|
| x-ms-batch-metadata | URI where the first change batch metadata can be uploaded |
| x-ms-epoch | epoch of the service replica |
| x-ms-request-id | Required: service-generated string that uniquely identifies the request |
| x-ms-maxFileSizeMB | maximum total size of all files in the batch (in MB) supported for upload by the service endpoint |
| x-ms-maxFileCount | maximum file count per batch |

PUT Change Batch Metadata

| Response Body |
|---|
| Binary MSF knowledge |

| Status | |
|---|---|
| 200-Success | Service knowledge is present in the body |
| 202-Accepted | Request is pending |
| 400-Bad Request | One or more of the request header is missing or invalid |
| 404-Not Found | Replica identified by the partnership ID and replica ID was not found |

PUT Change Batch Metadata

| URI |
|---|
| Opaque, returned by GET Knowledge or last PUT Change Batch Data requests |

| Query Parameters |
|---|
| Opaque, returned by GET Knowledge or last PUT Change Batch Data requests |

| Request Headers | |
|---|---|
| x-ms-partnership-id | partnership ID |
| x-ms-replica-id | replica ID |
| x-ms-epoch | epoch of the service replica |
| x-ms-device-id | unique identifier of the client device |
| x-ms-device-name | name of the client device |
| x-ms-client-correlation-id | string used by client for request identification |

| Request Body |
|---|
| PrepareBatchRequest |

| Response Headers | |
|---|---|
| x-ms-request-id | service-generated string that uniquely identifies the request |
| x-ms-batch-data | URI where the change batch MSF data can be uploaded |

| Response Body |
|---|
| PrepareBatchResponse |

| Status | |
|---|---|
| 200-Success | Service knowledge is present in the body |
| 202-Accepted | Request is pending |
| 400-Bad Request | One or more of the request header is missing or invalid, or request body is invalid |
| 404-Not Found | Replica identified by the partnership ID and replica ID was not found |

| PrepareBatchRequest Entry | Type | Description |
|---|---|---|
| Entries | Vector<PrepareBatch RequestEntry> | Array of PrepareBatchReques tEntry objects |

PrepareBatchRequestEntry is a subset of file metadata information that is necessary for staging the entry's upload.

| PrepareBatchRequestEntry Entry | Type | Description |
|---|---|---|
| FileId | SyncId | Unique ID of the file |
| StreamId | GUID | Version of the file content (not used for directories) |
| FileSize | ULONGLONG | File size in bytes (zero for directories) |

| PrepareBatchResponse Entry | Type | Description |
|---|---|---|
| Entries | Vector<PrepareBatch ResponseEntry> | Array of PrepareBatchResp onseEntry objects |

| PrepareBatchResponseEntry Entry | Type | Description |
|---|---|---|
| SyncId | SyncId | Unique ID of the file or directory |
| UploadUri | String | URI where the file data can be uploaded. Empty or null if file data is not required |
| PrepareStatus | LONG | File- or directory-specific preparation status |
| CloudStreamSize | ULONGLONG | Size of the file in the service storage |

PUT Change Batch Data

| URI |
|---|
| Opaque, returned by last PUT Change Batch Metadata request |

| Query Parameters |
|---|
| Opaque, returned by last PUT Change Batch Metadata request |

| Request Headers | |
|---|---|
| x-ms-partnership-id | partnership ID |
| x-ms-replica-id | replica ID |
| x-ms-epoch | epoch of the client replica |
| x-ms-device-id | unique identifier of the client device |
| x-ms-device-name | name of the client device |
| x-ms-client-correlation-id | string used by client for request identification |

| Request Body |
|---|
| ChangeBatch |

| Response Headers | |
|---|---|
| x-ms-request-id | service-generated string that uniquely identifies the request |
| x-ms-batch-metadata | URI where the next change batch metadata can be uploaded |

-continued

| Response Body |  |
|---|---|
| PutChangeBatchResponse | |
| Status | |
| 200-Success | Service knowledge is present in the body |
| 202-Accepted | Request is pending |
| 400-Bad Request | One or more of the request header is missing or invalid, or request body is invalid |

| PutChangeBatchResponse Entry | Type | Description |
|---|---|---|
| Entries | Vector<PutChangeBatch ResponseEntry> | Array of PutChangeBatch ResponseEntry objects |
| InitialReplicaETag | String | Identification of the service replica before batch is applied |
| NewReplicaETag | String | Identification of the service replica after batch is applied |

| PutChangeBatchResponseEntry Entry | Type | Description |
|---|---|---|
| SyncId | SyncId | Unique ID of the file or directory |
| Status | LONG | File- or directory-specific status |

Figure 6:
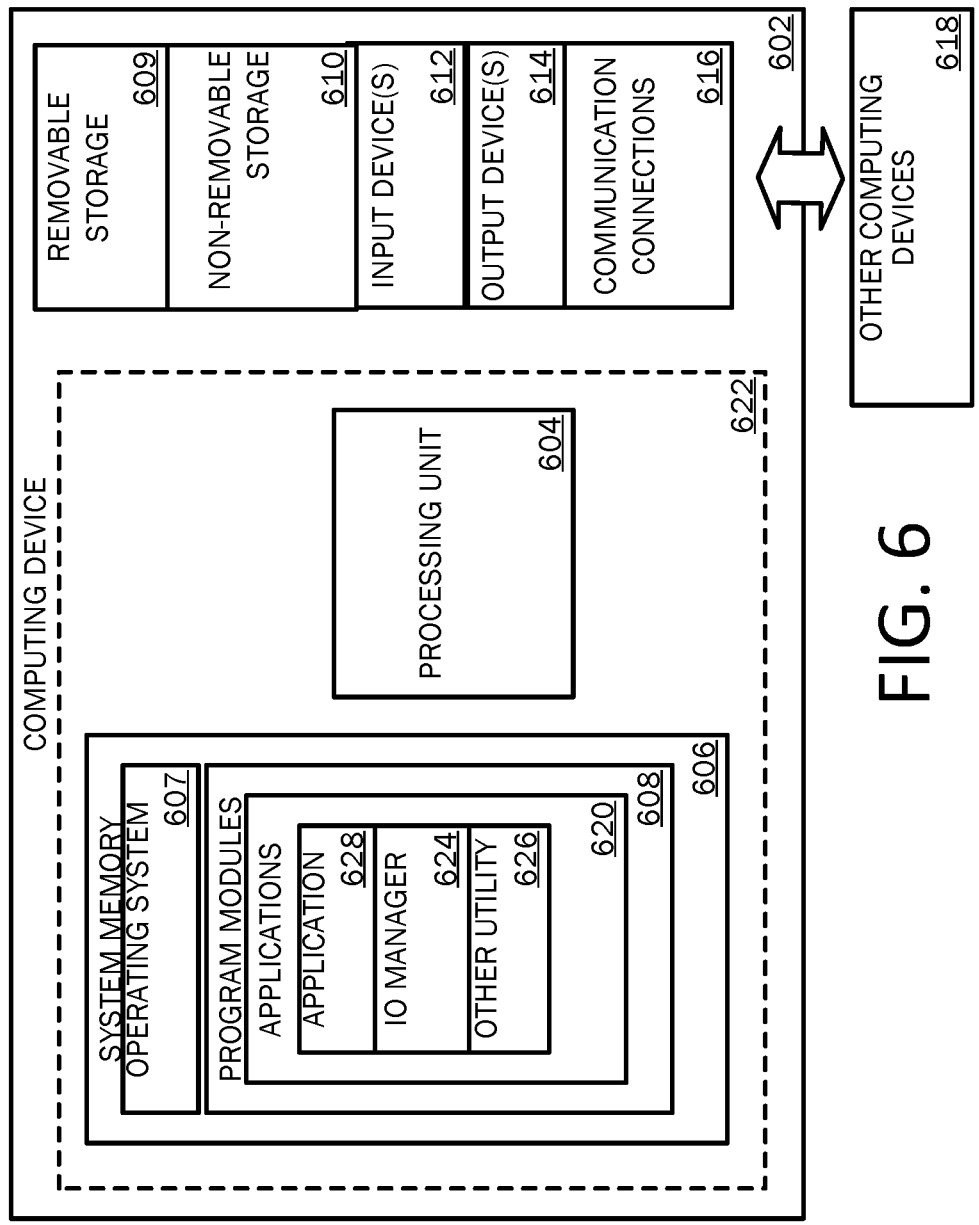
FIG. 6 is a block diagram illustrating an example of a computing device with which aspects of the present disclosure may be practiced.
Figure 7A:
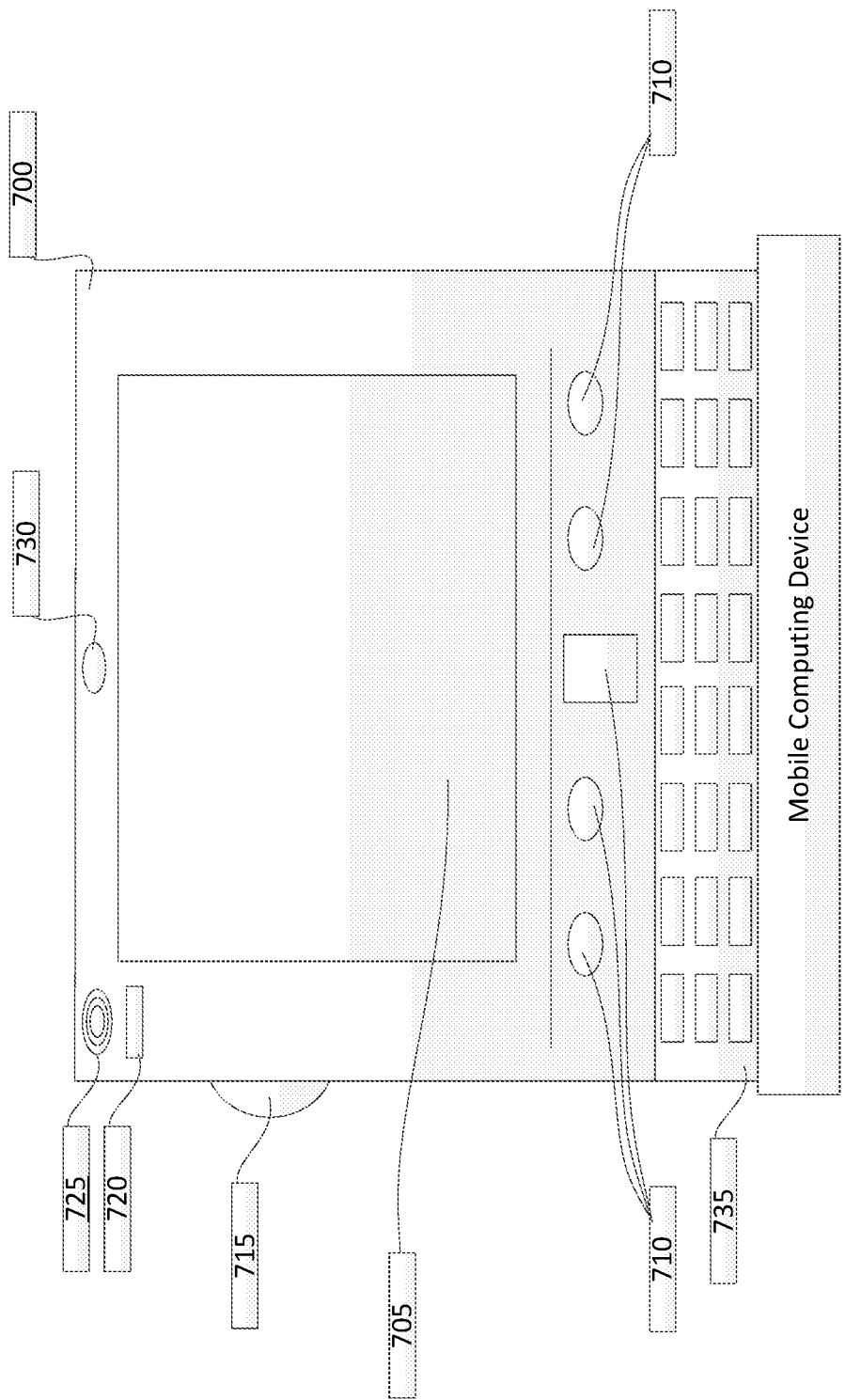
FIGS. 7A and 7B are simplified block diagrams of a mobile computing device with which aspects of the present disclosure may be practiced.
Figure 7B:
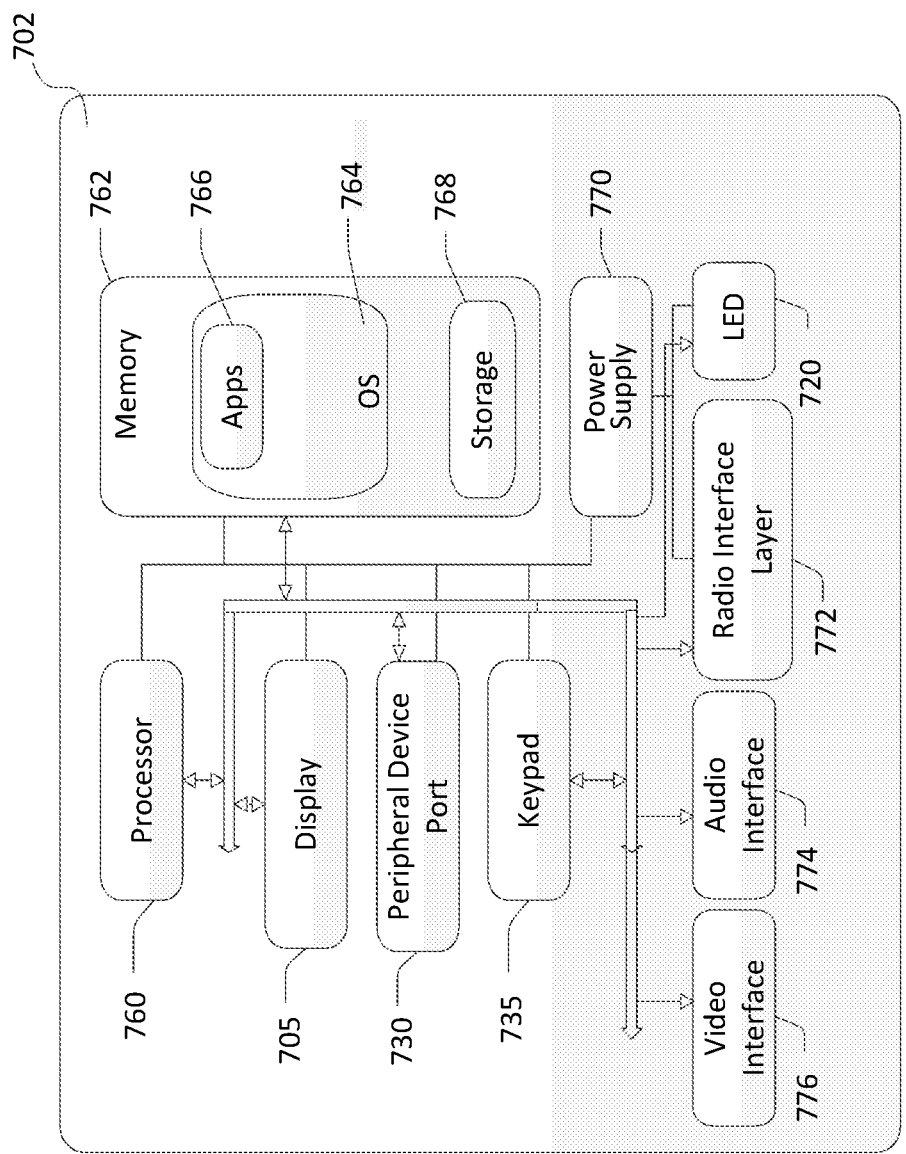
Figure 8:
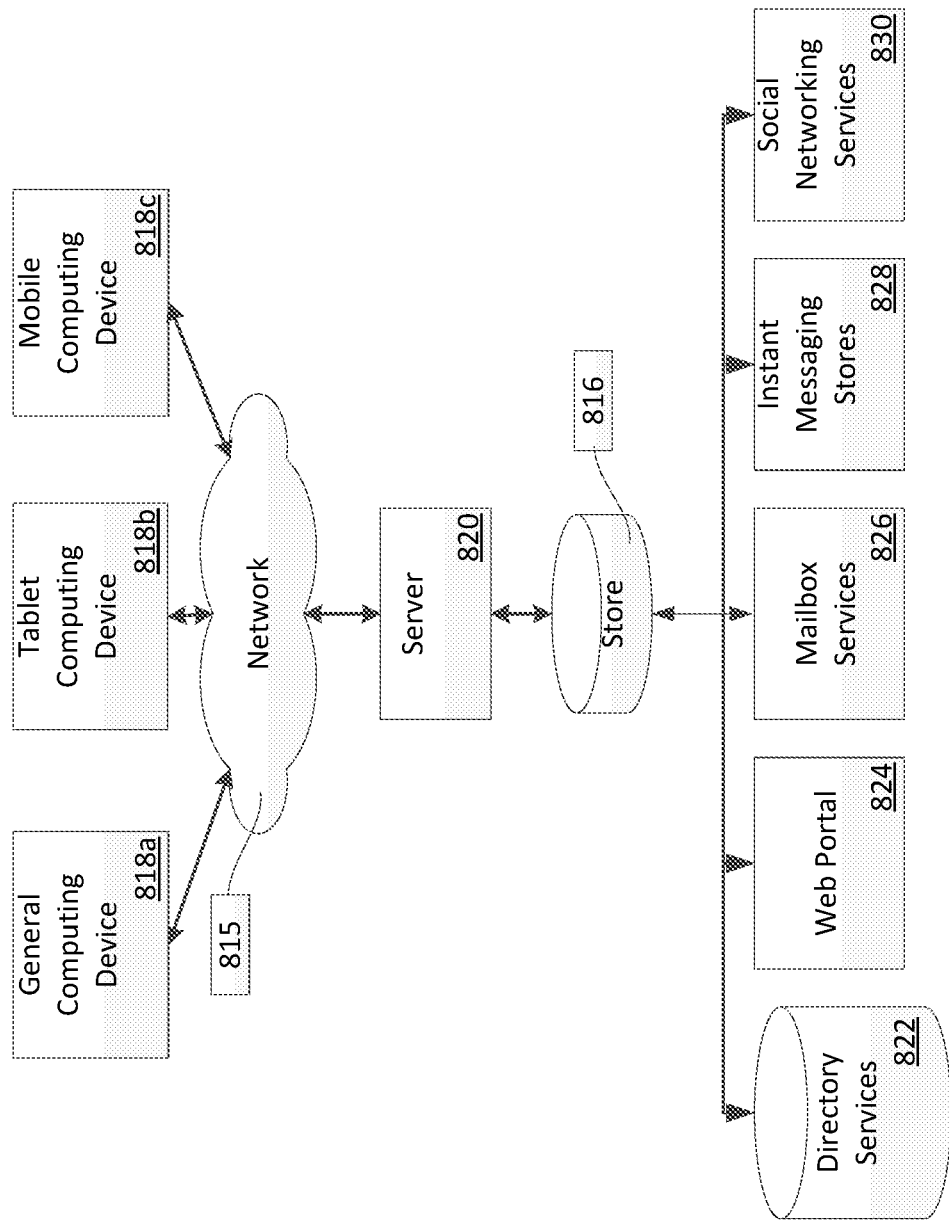
FIG. 8 is a simplified block diagram of a distributed computing system in which aspects of the present disclosure may be practiced.

FIGS. 6-8 and the associated descriptions provide a discussion of a variety of operating environments in which examples of the invention may be practiced. However, the devices and systems illustrated and discussed with respect to FIGS. 6-8 are for purposes of example and illustration and are not limiting of a vast number of computing device configurations that may be utilized for practicing examples of the invention, described herein.

FIG. 6 is a block diagram illustrating physical components of a computing device 602, for example a mobile processing device, with which examples of the present disclosure may be practiced. For example, computing device 602 may be an exemplary computing device for implementation of processing performed related to an exemplary synchronization protocol as described herein. In a basic configuration, the computing device 602 may include at least one processing unit 604 and a system memory 606. Depending on the configuration and type of computing device, the system memory 606 may comprise, but is not limited to, volatile storage (e.g., random access memory), non-volatile storage (e.g., read-only memory), flash memory, or any combination of such memories. The system memory 606 may include an operating system 607 and one or more program modules 608 suitable for running software programs/modules 620 such as IO manager 624, other utility 626 and application 628. As examples, system memory 606 may store instructions for execution. Other examples of system memory 606 may store data associated with applications. The operating system 607, for example, may be suitable for controlling the operation of the computing device 602. Furthermore, examples of the invention may be practiced in conjunction with a graphics library, other operating systems, or any other application program and is not limited to any particular application or system. This basic configuration is illustrated in FIG. 6 by those components within a dashed line 622. The computing device 602 may have additional features or functionality. For example, the computing device 602 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 606. While executing on the processing unit 604, program modules 608 (e.g., Input/Output (I/O) manager 624, other utility 626 and application 628) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 602 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 602 may also have one or more input device(s) 612 such as a keyboard, a mouse, a pen, a sound input device, a device for voice input/recognition, a touch input device, etc. The output device(s) 614 such as a display, speakers, a printer, etc. may also be included. The aforementioned devices are examples and others may be used. The computing device 604 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 606, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 602. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a personal data assistant, a tablet personal computer, a phablet, a slate, a laptop computer, and the like, with which examples of the invention may be practiced. For example, mobile computing device 700 may be an exemplary computing device for implementation of processing performed related to an exemplary synchronization protocol as described herein. For instance, mobile computing device 700 may be implemented to execute applications and/or application command control associated with an exemplary synchronization protocol. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 7A, one example of a mobile computing device 700 for implementing the examples is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative examples, mobile computing device 700 may incorporate more or less input elements. For example, the display 705 may not be a touch screen in some examples. In yet another alternative example, the mobile computing device 700 is a portable phone system, such as a cellular phone. The mobile computing device 700 may also include an optional keypad 735. Optional keypad 735 may be a physical keypad or a "soft" keypad generated on the touch screen display or any other soft input panel (SIP). In various examples, the output elements include the display 705 for showing a GUI, a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 can incorporate a system (i.e., an architecture) 702 to implement some examples. In examples, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA), tablet and wireless phone.

One or more application programs 766 may be loaded into the memory 262 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may include peripheral device port 730 that performs the function of facilitating connectivity between system 702 and one or more peripheral devices. Transmissions to and from the peripheral device port 730 are conducted under control of the operating system (OS) 764. In other words, communications received by the peripheral device port 730 may be disseminated to the application programs 766 via the operating system 764, and vice versa.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725.

In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with examples of the present invention, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one example of the architecture of a system for providing an application that reliably accesses target data on a storage system and handles communication failures to one or more client devices, as described above. The system of FIG. 8 may be an exemplary system for processing related to an exemplary synchronization protocol as described herein. Target data accessed, interacted with, or edited in association with programming modules 608, applications 620, and storage/memory may be stored in different communication channels or other storage types. For example, various documents may be stored using a directory service 822, a web portal 824, a mailbox service 826, an instant messaging store 828, or a social networking site 830, application 628, IO manager 624, other utility 626, and storage systems may use any of these types of systems or the like for enabling data utilization, as described herein. A server 820 may provide storage system for use by a client operating on general computing device 602 and mobile device(s) 700 through network 815. By way of example, network 815 may comprise the Internet or any other type of local or wide area network, and client nodes may be implemented as a computing device 602 embodied in a personal computer, a tablet computing device, and/or by a mobile computing device 700 (e.g., mobile processing device). Any of these examples of the client computing device 602, 200 and 202 may obtain content from the store 816.

Non-limiting examples of the present disclosure describes implementation of an exemplary synchronization protocol that identifies file data for synchronization as well as negotiates how to achieve data transport for synchronization of the file data. A connection for a particular synchronization protocol may be established with a client device. The particular synchronization protocol interfaces with a plurality of data transport protocols and is usable to identify file data to synchronize with the client device and determine a data transport protocol of the plurality of data transport protocols that is to be used to download/upload the particular file data. In one example, a request for synchronization of file data is received from a client device. As an example, the client device may be a protocol client and the request may be received at a protocol server. The request may comprise: identification that the request is generated using a particular file synchronization protocol, knowledge metadata including a compact representation of a version state that identifies file data associated with the client device, and a request for a uniform resource identifier that the client device may use to download the file data for synchronization. A change batch response may be generated. The change batch response may be generated by a processing device such as a protocol server device. An exemplary change batch response is usable for the synchronization of file data. As an example, the change batch response comprises: identification that the change batch response is generated using the particular file synchronization protocol, identification of particular file data for synchronization, instructions for accessing the particular file data including at least one uniform resource identifier for access to the particular file data, and instructions indicating at least one data transport protocol to utilize to obtain the particular file data, for example, when accessed using the uniform resource identifier. In the change batch response, the instructions that indicate at least one data transport protocol may further comprise an instruction to obtain first file data using a first data transport protocol, and an instruction to obtain second file data using a second data transport protocol that is different from the first data transport protocol. The change batch response may be transmitted to the client device. In at least one additional example, an indication that one or more files of the file data are synchronized with the client device may be received. The indication may comprise updated knowledge metadata and in some cases may be received in response to a follow-up request. Additional communications between a client device and a server device may occur, for example, where additional requests and change batch responses may be exchanged to complete synchronization of file data.

In another example, a connection for a particular synchronization protocol may be established between a processing device and another processing device. The particular synchronization protocol interfaces with a plurality of data transport protocols and is usable to identify file data to synchronize with the other processing device and determine a data transport protocol of the plurality of data transport protocols that is to be used to download/upload the particular file data. A processing device may generate a request for synchronization of file data. As an example, the request may be generated by a protocol client device intending to communicate with a protocol server device. The request may comprise identification that the request is generated using a particular file synchronization protocol, knowledge metadata including a compact representation of a version state that identifies file data associated with the processing device, and a request for a uniform resource identifier that the processing device can use to download the file data for synchronization. The request may be transmitted to another processing device such as the protocol server device, among other examples. In response to transmission of the request, a change batch response may be received. The change batch response may comprise: identification that the change batch response is generated using the particular file synchronization protocol, identification of particular file data for synchronization, instructions for accessing the particular file data including at least one uniform resource identifier for access to the particular file data, and instructions indicating at least one data transport protocol to utilize to obtain the particular file data, for example, when accessed using the uniform resource identifier. As an example, the uniform resource identifier may provide access to a storage associated with a protocol server. The particular file data may be downloaded (via the uniform resource identifier) using the data transport protocol identified in the change batch response. Further example, may comprise transmission of an indication that one or more files of the file data are synchronized with the client device. In one example, the indication comprises updated knowledge metadata. Additional communications between a processing device and another processing device may occur, for example, where additional requests and change batch responses may be exchanged to complete synchronization of file data.

In another example, a first processing device may interface with another processing device to synchronize file data via upload of the file data from the first processing device to a storage associated with the second processing device. A request for knowledge metadata that identifies a state of file data associated with the server device may be transmitted from the first processing device to the second processing device. As an example, a first processing device may be a protocol client device and a second processing device may be a protocol server device. The first processing device may receive the knowledge metadata, for example, from the second processing device. In response to receiving the knowledge metadata, the first processing device may generate a file synchronization request, wherein the file synchronization request identifies file data to synchronize with the second processing device. The file synchronization request may be transmitted to the second processing device. In response, the first processing device may receive, from the second processing device, a file synchronization response. The file synchronization response comprises data indicating a location to upload the file data, and instructions indicating at least one data transport protocol to utilize to upload the file data. Using the file synchronization response, the first processing device may upload the file data.

Non-limiting examples of the present disclosure describes implementation of an exemplary synchronization protocol to identify file data for synchronization as well as negotiate how to achieve data transport for synchronization of the file data. A synchronization protocol is a protocol usable to identify file data to synchronize with the processing device and communicate instructions to enable data transport of the file data. As an example, a first processing device (e.g., a protocol client) may interface with a second processing device (e.g., a protocol server) to negotiate file synchronization between devices. As identified above, descriptions are not limited to a single processing device. For instance, a protocol client and/or a protocol server may be one or more devices (connected over a distributed network). A protocol client may be attempting synchronize file data with a protocol server by downloading file data from one or more storages associated with the protocol server, for example. For instance, a protocol client may be attempting to download file data from a distributed network environment to synchronize file data with the distributed network. A communication channel may be established between the protocol client and the protocol server for a file synchronization protocol. In one example, a request for synchronization of data is sent from a protocol client and received by a protocol server. The request comprises knowledge metadata including a compact representation of a version state for file data associated with the processing device. The knowledge metadata is used by the protocol server for identification of the file data for synchronization. In one example, the protocol server may compare the receive knowledge metadata to metadata associated with the protocol server that identified a state of file data corresponding with the protocol server. For instance, the file data corresponding with the protocol server may be file data stored across storages of a distributed network. In response to receiving the request, a response is generated by the protocol server. The response may comprise: identification of file data for synchronization, instructions for (the protocol client to) access the file data and instructions indicating a data transport protocol to utilize (for the protocol client) to obtain the file data. Instructions for accessing the file data may comprise a uniform resource identifier to connect the processing device with a storage associated with the system. The response may be transmitted to the protocol client, for example, to enable the protocol client to synchronize file data. In one example, the response is transmitted to the protocol client using the connection for the synchronization protocol. The protocol client may utilize the response to access the file data and download the file data using one or more data transport protocols identified in the response. The data transport protocol is at least one selected from a group consisting of HTTP, HTTP/S, FTP, and FSP, SMTP, SFTP, and FTPS. However, the synchronization protocol may be configured to interface with any data transport protocol. In further example, a second request is received by the protocol server from the protocol client. The second request may comprise updated knowledge metadata including a compact representation of a version state for file data associated with the processing device, for example, after a change to the protocol client has occurred. A second response to the second request may be generated by the protocol client. The second response may comprise: identification of second file data for synchronization, instructions for accessing the second file data and instructions indicating a data transport protocol to utilize to obtain the second file data. The second response may be transmitted to the protocol client to enable the protocol client to synchronize by downloading the second file data.

In other non-limiting examples of the present disclosure, an exemplary synchronization protocol is implemented to enable a processing device to synchronize file data with another processing device and/or distributed network. As an example, a first processing device (e.g., a protocol client) may interface with a second processing device (e.g., a protocol server) to negotiate file synchronization between devices. As identified above, descriptions are not limited to a single processing device. For instance, a protocol client and/or a protocol server may be one or more devices (connected over a distributed network). A protocol client may be attempting synchronize file data with a protocol server by uploading file data to one or more storages associated with the protocol server, for example. For instance, a protocol client may be attempting to upload file data to a distributed network environment to synchronize a local copy of file data with the distributed network. A communication channel may be established between the protocol client and the protocol server for a file synchronization protocol. In one example, a request is transmitted for knowledge metadata that identifies a state of file data associated with a protocol server. The knowledge metadata may be transmitted to and received at the protocol client. In response, a file synchronization request may be generated by the protocol client. The file synchronization request may identify file data to synchronize with the protocol server. File data for synchronization may be identified by processing operations where the protocol client may determine a difference between file state metadata for the protocol client and the knowledge metadata received from the protocol server. File data to synchronize with the protocol server is identified based on a determination of the difference between file states. The file synchronization request may be transmitted to the protocol server. A file synchronization response may be received from the protocol server. The file synchronization response may comprise data indicating a location to upload the file data, and instructions indicating at least one data transport protocol to utilize to upload the file data. The file synchronization response may be used to transmit the file data for upload, for example, to a storage associated with the protocol server. The protocol client may utilize one or more different data transport protocols (identified by the synchronization protocol) to upload the file data to a protocol server, for example. In examples, the file synchronization request and the file synchronization response are generated by the file synchronization protocol.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   receiving, from a client device, a request to upload file data to a server, wherein the request comprises:
   identification of file data to be uploaded to the server;
   a request for a location to upload the file data; and
   a request for what data transport protocol to utilize to upload the file data;
   generating, in response to the request to upload file data to the server, a response to the client device, wherein the response comprises:
   at least one location to upload the file data; and
   at least one data transport protocol to utilize to upload the file data, wherein the at least one data transport protocol comprises a first data transport protocol and a second data transport protocol that is different from the first data transport protocol;
   receiving the file data; and
   causing the file data to be stored in the at least one location.

2. The method of claim 1, further comprising:
   receiving, from the client device, a metadata request for metadata indicating a version state of the file data for the server; and
   providing the metadata to the client device prior to receiving the request to upload the file data.

3. The method of claim 2, wherein the identification of the file data to be uploaded to the server comprises a metadata subset for the file data that is derived from the metadata provided to the client device.

4. The method of claim 1, wherein the at least one location to upload the file data includes a first location and a second location that is different from the first location.

5. The method of claim 1, wherein the response includes a link to the at least one location to upload the file data, wherein the at least one location comprises a storage associated with the server.

6. The method of claim 1, further comprising:
   receiving, from the client device, an indication to commit the file data; and
   causing the file data to be committed to the at least one location.

7. The method of claim 1, wherein the at least one data transport protocol is at least one selected from a group consisting of HTTP, HTTP/S, FTP, SMTP, FSP and SFTP.

8. A system comprising:
   at least one processor; and
   a memory operatively connected with the at least one processor storing computer-executable instructions that, when executed by the at least one processor, causes the at least one processor to execute a method that comprises:
   receiving, from a client device, a request to upload file data to a server, wherein the request comprises:
   identification of file data to be uploaded to the server;
   a request for a location to upload the file data; and
   a request for what data transport protocol to utilize to upload the file data;
   generating, in response to the request to upload file data to the server, a response to the client device, wherein the response comprises:
   at least one location to upload the file data; and
   at least one data transport protocol to utilize to upload the file data, wherein the at least one data transport protocol comprises a first data transport protocol and a second data transport protocol that is different from the first data transport protocol;
   receiving the file data; and
   causing the file data to be stored in the at least one location.

9. The system of claim 8, wherein the method further comprises:
   receiving, from the client device, a metadata request for metadata indicating a version state of the file data for the server; and
   providing the metadata to the client device prior to receiving the request to upload the file data.

10. The system of claim 9, wherein the identification of the file data to be uploaded to the server comprises a metadata subset for the file data that is derived from the metadata provided to the client device.

11. The system of claim 8, wherein the at least one location to upload the file data includes a first location and a second location that is different from the first location.

12. The system of claim 8, wherein the response includes a link to the at least one location to upload the file data, wherein the at least one location comprises a storage associated with the server.

13. The system of claim 8, wherein the method further comprises:
receiving, from the client device, an indication to commit the file data.

14. The system of claim 8, wherein the at least one data transport protocol is at least one selected from a group consisting of HTTP, HTTP/S, FTP, SMTP, FSP and SFTP.

15. A system comprising:
at least one processor; and
a memory operatively connected with the at least one processor storing computer- executable instructions that, when executed by the at least one processor, causes the at least one processor to execute a method that comprises:
sending, to a server, a request by a client device to upload file data to the server, wherein the request comprises:
identification of file data to be uploaded to the server;
a request for a location to upload the file data; and
a request for what data transport protocol to utilize to upload the file data;
receiving, in response to the request to upload file data to the server, a response from the server, wherein the response comprises:
at least one location to upload the file data, wherein the at least one location includes a first location and a second location that is different from the first location; and
at least one data transport protocol to utilize to upload the file data, wherein the at least one data transport protocol comprises a first data transport protocol for the first location and a second data transport protocol for the second location that is different from the first data transport protocol; and
causing the file data to be sent to the at least one location.

16. The system of claim 15, wherein the method further comprises:
sending, by the client device, a metadata request for metadata indicating a version state of the file data for the server; and
receiving the metadata at the client device prior to receiving the request to upload the file data.

17. The system of claim 16, wherein the method further comprises:
determining, based on the metadata, the file data to be uploaded to the server by comparing the metadata to state information for the client device, wherein the identification of the file data to be uploaded to the server comprises a metadata subset for the file data that is based on the determining.

18. The system of claim 15, wherein the at least one location to upload the file data includes a first location and a second location that is different from the first location.

19. The system of claim 15, wherein the response includes a link to the at least one location to upload the file data, wherein the at least one location comprises a storage associated with the server.

20. The system of claim 15, wherein the method further comprises:
sending, by the client device, an indication to commit the file data; and
receiving an indication that the file data has been committed to the at least one location.

* * * * *